United States Patent
Kawamura

(10) Patent No.: US 6,465,146 B1
(45) Date of Patent: Oct. 15, 2002

(54) RADIATION-SENSITIVE LITHOGRAPHIC PRINTING PLATE PRECURSOR

(75) Inventor: Koichi Kawamura, Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 26 days.

(21) Appl. No.: 09/635,207

(22) Filed: Aug. 9, 2000

(30) Foreign Application Priority Data

Aug. 9, 1999 (JP) ............................................. 11-225560
Aug. 24, 1999 (JP) ............................................. 11-237263

(51) Int. Cl.⁷ ............................................... G03F 7/004
(52) U.S. Cl. .................. 430/138; 430/348; 430/270.11
(58) Field of Search .............................. 430/138, 270.1, 430/348

(56) References Cited

U.S. PATENT DOCUMENTS

| | | | |
|---|---|---|---|
| 4,780,390 A | | 10/1988 | Hosoi |
| 5,104,767 A | * | 4/1992 | Nakamura .................. 430/138 |
| 5,603,986 A | * | 2/1997 | Yabuuchi et al. ...... 427/213.34 |
| 5,985,526 A | * | 11/1999 | Tutt et al. .................... 430/332 |
| 6,171,748 B1 | * | 1/2001 | Tanaka et al. ............... 430/138 |
| 6,174,642 B1 | * | 1/2001 | Polykarpov et al. ........ 430/138 |
| 6,245,477 B1 | * | 6/2001 | Ray et al. .................... 430/138 |
| 6,399,270 B1 | * | 6/2002 | Mori et al. ............... 430/270.1 |
| 2001/0018159 A1 | * | 8/2001 | Maemoto .................... 430/138 |
| 2001/0036592 A1 | * | 11/2001 | Hoshi et al. ............. 430/270.1 |
| 2002/0025493 A1 | * | 2/2002 | Hotta ....................... 430/278.1 |
| 2002/0031715 A1 | * | 3/2002 | Maemoto et al. ........... 430/138 |
| 2002/0033108 A1 | * | 3/2002 | Akiyama et al. ........... 101/457 |

FOREIGN PATENT DOCUMENTS

| | | |
|---|---|---|
| EP | 0385247 A1 | 9/1990 |
| EP | 0903224 A2 | 3/1999 |
| WO | WO99/38688 | 8/1999 |

\* cited by examiner

*Primary Examiner*—Janet Baxter
*Assistant Examiner*—Barbara Gilliam
(74) *Attorney, Agent, or Firm*—Burns, Doane, Swecker & Mathis, LLP

(57) ABSTRACT

Disclosed is a radiation-sensitive lithographic printing plate precursor comprising a photo-heat conversion agent incorporated therein, wherein the photo-heat conversion agent is a particulate metal oxide comprising an organic photo-heat conversion dye encapsulated therein.

17 Claims, No Drawings

RADIATION-SENSITIVE LITHOGRAPHIC PRINTING PLATE PRECURSOR

FIELD OF THE INVENTION

The present invention relates to a radiation-sensitive lithographic printing plate precursor. More particularly, the present invention relates to a positive-working polarity conversion type unprocessed printing plate precursor.

BACKGROUND OF THE INVENTION

In general, a lithographic printing plate precursor comprises a lipophilic image area which receives an ink during printing process and a hydrophilic non-image area which receives a dampening water. As a precursor from which such a lithographic printing plate is prepared there has heretofore been widely known a PS plate comprising a lipophilic photosensitive resin layer provided on a hydrophilic support. In order to make a printing plate from such a PS plate, a method may be normally used which comprises exposing the PS plate to light through a lithographic film having an image recorded thereon, and then dissolving the non-image area away from the PS plate with a developer. In accordance with this method, a desired printing plate can be obtained.

The foregoing conventional method for making a printing plate from PS plate is disadvantageous in that it requires a development step to dissolve the non-image area away from the PS plate. Accordingly, the conventional plate making method faces an assignment of eliminating or simplifying the additional wet processing step. In particular, the whole industry's recent great concern is the disposal of waste liquid discharged from the wet processing step from the standpoint of global environment. Thus, there is an ever growing demand for improvement in these requirements.

As one of simple plate-making methods meeting these requirements there has been proposed a plate-making method which performs image formation on a printing plate precursor free from development using a heat energy developed by photo-heat conversion. Since high output solid lasers such as semiconductor laser and YAG laser have been available at low price, a photo-heat conversion type plate-making method using such a laser as an image-recording means has recently been considered favorable. In this type of plate-making method, a high power density exposure using a high output laser causes a large amount of optical energy to be concentrated onto an area to be exposed for an instantaneous period of time, making it possible to effectively convert optical energy to heat energy by which a thermal change such as chemical change, phase change and state or structure change then takes place. The change is utilized to record an image. In other words, image data is inputted in the form of optical energy, but image recording is carried out by reaction using a heat energy. In general, such a recording process utilizing heat developed by high power density exposure is called heat mode recording, and the conversion of optical energy to heat energy is called photo-heat conversion.

Known examples of the use of an infrared laser-sensitive positive-working lithographic printing plate precursor containing an infrared absorber include one involving the combined use of an acid-decomposable carboxylic acid ester and an infrared absorbing dye as disclosed in JP-A-7-186562 (The term "JP-A" as used herein means an "unexamined published Japanese patent application") and one involving the combined use of an ablation polymer and an infrared absorbing dye as disclosed in U.S. Pat. No. 5,605,780.

Examples of the use of an infrared laser-sensitive negative-working lithographic printing plate precursor include one involving the combined use of a resol resin as a heat-crosslinkable resin, an acid generator and an infrared absorber as disclosed in JP-A-56-69193, JP-A-7-20629 and JP-A-7-271029.

However, these proposed lithographic printing plate precursors leave something to be desired in sensitivity from the practical standpoint of view and thus have been required to have an enhanced sensitivity. Further, many of these infrared absorbers to be incorporated in these lithographic printing plate precursors occasionally undergo decomposition to become hydrophobic themselves after photo-heat conversion. The resulting decomposition product can be left behind as a film on the exposed area or can form a tailing-like solid phase in the dampening water during printing, causing scumming.

There are two representative examples of conventional positive-working polarity conversion type unprocessed printing plate which have been under the research and development to solve the foregoing defects. One of the two representative examples is a positive-working unprocessed printing plate comprising a polymer having a group which changes from hydrophobic to hydrophilic when acted upon by heat such as alkoxyalkylester group as disclosed in EP 652483. The other is a positive-working unprocessed printing plate comprising a silica gel-containing sol-gel crosslinked sulfonate compound. Both the two groups provide elimination of the foregoing defects. However, these proposals leave something to be desired in the prevention of scumming on the non-image area, which is one of important requirements for printing quality.

SUMMARY OF THE INVENTION

It is therefore an object of the present invention to provide a radiation-sensitive lithographic printing plate precursor which allows direct plate making from digital data from computers, etc. using an infrared laser. It is another object of the present invention to provide a radiation-sensitive lithographic printing plate precursor which exhibits a sufficient sensitivity and causes no scumming on printed matters.

It is a further object of the present invention to provide a radiation-sensitive lithographic printing plate precursor which requires no special processing such as wet development and rubbing after image writing. In particular, it is a further object of the present invention to provide a radiation-sensitive lithographic printing plate precursor which allows direct plate making from digital data by recording using a solid laser, semiconductor laser or the like which emits infrared rays.

It is a still further object of the present invention to provide a positive-working radiation-sensitive lithographic printing plate precursor which exhibits a long press life and can give printed matters free from scumming on image area.

The inventor found that scumming on printed matters is greatly attributed to thermal decomposition of a photo-heat conversion compound such as infrared absorbent. The inventor then found that scumming on printed matters can be prevented by incorporating a photo-heat conversion compound in the polarity conversion layer in the form of photo-heat conversion compound-encapsulated particulate metal oxide having a photo-heat conversion compound encapsulated in a protective material structure such as particulate silica gel rather than in direct form. It was thus found that the encapsulation in a protective material structure makes the photo-heat conversion compound less decomposable and hydrophobicized when irradiated with laser beam, enhancing the hydrophilicity of the area irradiated with light and hence improving the scumming resistance of the non-image area. Further, studies were made of printing plate precursor embodying these findings. As a result, it was found that the combination of the foregoing photo-heat conversion compound-encapsulated particulate metal oxide with a specific polymer compound makes it possible to enhance the effect of prolonging press life and inhibiting scumming on printed matters, which is an object of the present invention.

In other words, the present invention is intended for a radiation-sensitive lithographic printing plate precursor comprising a photo-heat conversion agent incorporated therein, wherein the photo-heat conversion agent is a particulate metal oxide comprising an organic photo-heat conversion compound encapsulated therein.

The present invention is intended also for a radiation-sensitive lithographic printing plate precursor having a sensitive layer comprising at least a binder and a photo-heat conversion agent incorporated therein provided on a support, wherein the binder is a crosslinked polymer compound having a functional group which changes from hydrophobic to hydrophilic when acted upon by an acid, radiation or heat and the photo-heat conversion agent is a particulate metal oxide comprising an organic photo-heat conversion compound encapsulated therein.

The photo-heat conversion agent to be incorporated in the sensitive layer in the foregoing radiation-sensitive lithographic printing plate precursor of the present invention comprises an organic photo-heat conversion compound encapsulated therein. The organic photo-heat conversion compound particularly suitable for the purpose of the present invention is an infrared-absorbing dye (hereinafter occasionally referred simply to as "infrared absorber", "infrared absorber of the invention" or "IR dye"). The organic photo-heat conversion compound is encapsulated and protected and thus undergoes no decomposition and hydrophobicization when irradiated with laser beam. Thus, the sensitive layer exhibits an enhanced hydrophilicity on the exposed area. At the same time, the resulting printed matters can be prevented from being scummed with decomposition products on the non-image area.

As the component to be combined with the foregoing photo-heat conversion agent to form the sensitive layer there is preferably used a binder. A particularly preferred example of the binder is a crosslinked polymer compound having a functional group which changes from hydrophobic to hydrophilic when acted upon by an acid, radiation or heat. Examples of such a polymer compound include polymer compounds crosslinked by photo-crosslinking, photo-polymerization and photo-decomposition polymerization. Among these crosslinked polymer compounds, a polymer compound having a secondary sulfonic acid ester group or alkoxycarboxylic acid ester group as a functional group provides a remarkable enhancement of the foregoing effect of the invention.

As the crosslinking method by which a crosslinked polymer compound having a functional group which changes from hydrophobic to hydrophilic when acted upon by an acid, radiation or heat that is used as a binder in the invention can be prepared, there may be used any of photo-crosslinking method, photopolymerization method and photo- or heat-hydrolysis polymerization method. Preferred among these binders is a compound obtained by the reaction of a compound having in the same molecule a functional group which changes from hydrophobic to hydrophilic when acted upon by an acid, radiation or heat and a functional group which reacts with a hydrolysis-polymerizable compound represented by the following general formula (1) with the hydrolysis-polymerizable compound represented by the following general formula (1):

wherein $R_1$ and $R_2$ may be the same or different and each represent an alkyl or aryl group; X represents Si, Al, Ti or Zr; and n represents an integer of from 0 to 2.

In the radiation-sensitive lithographic printing plate comprising such a binder, the hydrolysis-polymerizable compound undergoes hydrolysis-polymerization to form an inorganic oxide matrix (hydrolysis-polymerization product) in the coating film, enhancing the film strength of the sensitive layer as a whole. In this arrangement, the radiation-sensitive lithographic printing plate exhibits a prolonged press life.

Among the foregoing hydrolysis-polymerizable binders, a compound obtained by the reaction of (1) a compound having in the same molecule a sulfonic acid ester group and/or alkoxyalkylester group and at least one functional group selected from the group consisting of —OH, —NH$_2$, —COOH, —NH—CO—R$_3$ and —Si (OR$_4$)$_3$ (in which R$_3$ and R$_4$ each represent an alkyl or aryl group, with the proviso that when the compound having these functional groups have both R$_3$ and R$_4$, they may be the same or different) with (2) a hydrolysis-polymerizable compound represented by the above general formula (1) provides a radiation-sensitive lithographic printing plate suitable for the object of the present invention.

The foregoing binder is a product of the reaction of a compound (hereinafter occasionally referred to as "Compound A") having in the same molecule a sulfonic acid ester group and/or alkoxyalkylester group (hereinafter occasionally referred to as "functional group X") and at least one functional group (hereinafter occasionally referred to as "functional group Y") selected from the group consisting of —OH, —NH$_2$, —COOH, —NH—CO—R$_3$ and —Si (OR$_4$)$_3$ (in which R$_3$ and R$_4$ each represent an alkyl or aryl group, with the proviso that when the compound having these functional groups have both R$_3$ and R$_4$, they may be the same or different) with a hydrolysis-polymerizable compound represented by the foregoing general formula (1). For example, when the binder is applied to a proper support, the hydrolysis-polymerizable compound undergoes hydrolysis polymerization to form an inorganic oxide matrix in the coating film. At the same time, the hydrolysis-polymerizable compound reacts with the functional group Y in Compound A to produce an organic-inorganic complex (reaction product). As a result, a dense crosslinked structure is given, enhancing the film strength of the sensitive layer as a whole. The resulting radiation-sensitive lithographic printing plate has an extremely prolonged press life.

If necessary, the sensitive layer of the invention may comprise a low-molecular weight compound incorporated therein which similarly has a polarity conversion effect when acted upon by an acid, radiation or heat. It is also preferred that the sensitive layer comprise an acid generator or the like incorporated therein. Referring to the acid generator, the infrared absorber having a hydrophobic functional group which changes to hydrophilic when acted upon by heat also acts as an acid generator itself. Therefore, such an acid generator is not necessarily required. However, the addition of an acid generator may be effective for further enhancement of sensitivity.

These constituents will be further described hereinafter.

DETAILED DESCRIPTION OF THE INVENTION

Configuration of Radiation-sensitive Layer

The present invention can be applied to both negative-working and positive-working heat-sensitive lithographic printing plate precursors. A particularly useful form to which the present invention can be applied is a positive-working printing plate precursor where the polarity changes from hydrophobic to hydrophilic upon exposure of laser beam. The radiation-sensitive layer which can be preferably used in the invention comprises in combination (1) a photo-heat conversion agent in the form of particulate metal oxide having the foregoing photo-heat conversion compound encapsulated therein and (2) a crosslinked polymer compound having a functional group which changes from hydrophobic to hydrophilic when acted upon by an acid, radiation or heat as a binder. Particularly preferred among the polymer compounds to be combined with the photo-heat conversion agent are a polymer compound for positive-working photosensitive material having as a functional group an alkoxyalkylester group which changes from hydrophobic to hydrophilic as described in WO92/9934 (3M) and a polymer compound for positive-working photosensitive material having as a functional group a sulfonic acid ester group which changes from hydrophobic to hydrophilic as described in JP-A-10-282672.

The various components constituting the radiation-sensitive layer in the lithographic printing plate of the invention will be further described hereinafter.

1. Photo-heat Conversion Agent

The photo-heat conversion agent of the invention is a particulate metal oxide comprising an organic photo-heat conversion compound encapsulated therein as previously mentioned. Firstly, an encapsulation method for enclosing an organic photo-heat conversion compound in a particulate metal oxide will be described hereinafter.

Method for Encapsulating Organic Photo-heat Conversion Compound

When the organic photo-heat conversion compound is an infrared absorbing dye (IR dye), the effect of the invention becomes remarkable. Thus, the following description refers to the encapsulation of IR dye. However, the encapsulation of other organic photo-heat conversion compounds can be effected similarly.

The IR dye-encapsulated particulate metal oxide can be prepared using an existing method. The particulate metal oxide is preferably prepared from a hydrolyzable alkoxy metal compound from the synthetic stand point of view. In some detail, as starting materials of the IR dye-encapsulated particulate metal oxide there are used an IR dye and a hydrolysis-polymerizable alkoxy metal compound which are then dissolved in or mixed with a water-containing solution. Subsequently, to the aqueous solution or aqueous dispersion is added an acidic or alkaline catalyst. Then, the hydrolysis-polymerizable alkoxy metal compound undergoes hydrolysis and polymerization (condensation) reaction. During this polymerization reaction, the IR dye is taken into the gel structure of the resulting metal oxide to obtain the desired particulate metal oxide having a photo-heat conversion compound embedded therein. Specific examples of useful method for producing a particulate metal oxide having a photo-heat conversion compound embedded therein include a spray method as described in C. J. Serna, "Journal of Non-Cryst. Solids", vol. 147 & 148, page 621 (1992), and a solution polymerization method as described in Shuichi Shibata, "Kogyo Zairyo (Industrial Materials)", vol. 46, No. 8, page 37 (1988) and S. Shibata, "Journal of Sol-Gel Science and Technology", vol. 2, page 755 (1944). Further, a method may be employed which comprises preparing a particulate metal oxide having an organic photo-heat conversion compound embedded therein, and then mechanically grinding the particulate metal oxide to prepare finely divided particles as described in D. Avnir, "Journal of Physical Chemistry", vol. 88, page 5956 (1984) and S. K. Lam, "Chemical Physics Letters", vol. 281, page 35 (1997).

Metal Oxide for Encapsulating Organic Photo-heat Conversion Compound

The metal oxide for encapsulating an photo-heat conversion compound to be used in the invention will be further described hereinafter. Examples of the metal constituting the metal oxide include alkaline earth metal, transition metal, rare earth metal, and metal belonging to the groups 3 to 5 and 13 to 15 in the periodic table.

The metal oxide of the invention is preferably obtained by the polymerization reaction of hydrolysis-polymerizable organic compound of such a metal.

Examples of the metallic element in the hydrolysis-polymerizable organic metal compound include alkaline rare earth metal, transition metal, rare earth metal, and metal belonging to the groups 3 to 5 and 13 to 15 in the periodic table. Preferred among these metals are metallic elements belonging to the groups 4, 13 and 14 in the periodic table, such as aluminum, titanium, zirconium and silicon. Particularly preferred among these metals are aluminum and silica. Even more desirable among these metals is silica. Such metallic elements may be encapsulated in the metal oxide, singly or in combination of two or more thereof. Examples of the hydrolysis-polymerizable group in the hydrolysis-polymerizable organic metal compound include a $C_{1-10}$ alkoxy group such as methoxy group, ethoxy group, propoxy group, isopropoxy group, butoxy group, isobutoxy group, pentyloxy group and hexyloxy group. Preferred among these hydrolysis-polymerizable groups are $C_{1-4}$ alkoxy groups. Particularly preferred among these alkoxy groups are methoxy group, ethoxy group, and propoxy group. The organic metal compound may comprise one or more of these hydrolysis-polymerizable groups incorporated therein. However, the organic metal compound needs to comprise at least two such hydrolysis-polymerizable groups incorporated therein.

Examples of those containing aluminum among the foregoing hydrolysis-polymerizable organic metal compounds include trimethoxy aluminate, triethoxy aluminate, and tripropoxy aluminate. Examples of those containing titanium among the foregoing hydrolysis-polymerizable organic metal compounds include trimethoxy titanate, tetramethoxy titanate, triethoxy titanate, tetraethoxy titanate, tetrapropoxy titanate, chlorotrimethoxy titanate, chlorotriethoxy titanate, ethyltrimethoxy titanate, methyltriethoxy titanate, ethyltrietoxy titanate, diethyldiethoxy titanate, phenyltrimethoxy titanate, and phenyltriethoxy titanate. Examples of those containing zirconium among the foregoing hydrolysis-polymerizable organic metal compounds include those described with reference to compounds containing titanium except that titanate is replaced by zirconate.

Examples of those containing silicon among the foregoing hydrolysis-polymerizable organic metal compounds include a compound represented by the following general formula:

$$(R^1)_n Si(OR^2)_{4-n}$$

wherein $R^1$ represents a $C_{1-4}$ alkyl or aryl group which may have a substituent; $R^2$ represents a $C_{1-4}$ alkyl group, and $R^1$ and $R^2$ may be the same or different; and n represents an integer of from 0 to 2.

Specific examples of the foregoing organic metal compound containing silicon include trimethoxy silane, triethoxy silane, tripropoxy silane, tetramethoxy silane, tetraethoxy silane, tetrapropoxy silane, methyltrimethoxy silane, ethyltrimethoxy silane, propyltrimethoxy silane, methyltriethoxy silane, ethyltriethoxy silane, propyltriethoxy silane, dimethyldimethoxy silane, diethyldiethoxy silane, γ-chloropropyltriethoxy silane, γ-mercaptopropyltrimethoxy silane, γ-mercaptopropyltriethoxy silane, γ-aminopropyltrimethoxy silane, γ-aminopropyltriethoxy silane, phenyltrimethoxy silane, phenyltriethoxy silane, phenyltripropoxy silane, diphenyldimethoxy silane, and diphenyldiethoxy silane. Preferred among these organic metal compounds are tetramethoxy silane, tetraethoxy silane, methyltrimethoxy silane, ethyltrimethoxy silane, methyltriethoxy silane, ethyltriethoxy silane, dimethyldiethoxy silane, phenyltrimethoxy silane, phenyltriethoxy silane, diphenyldimethoxy silane, and diphenyldiethoxy silane.

The foregoing hydrolysis-polymerizable organic metal compounds may be used singly or in combination of two or more thereof. These hydrolysis-polymerizable organic metal compounds may be partly subjected to hydrolysis followed by dehydration condensation.

Organic Photo-heat Conversion Compound to be Encapsulated in Metal Oxide

The photo-heat conversion material to be encapsulated in a metal oxide to form a photo-heat conversion agent will be further described hereinafter. As the photo-heat conversion material to be used in the invention there may be used any material which can receive light such as ultraviolet ray, visible light, infrared ray and white light to convert it to heat. Examples of such a photo-heat conversion material include carbon black, graphite powder, iron oxide powder, lead oxide, silver oxide, chromium oxide, iron sulfide, chromium sulfide, and metal powder. In particular, an organic photo-heat conversion compound is preferred. A particularly preferred example of organic photo-heat conversion compound is a dye or pigment which effectively absorbs infrared rays having a wavelength range of from 760 nm to 1,200 nm, i.e., IR dye.

As the dye to be used in the invention there may be used any of commercially available dyes and known dyes described in references (e.g., "Senryo Binran (Handbook of Dyes)", compiled by Yuki Gosei Kagaku Kyokai (Society of Organic Synthetic Chemistry), 1970. Specific examples of such dyes include azo dye, metal complex salt azo dye, pyrazolone azo dye, anthraquinone dye, phthalocyanine dye, carbonium dye, quinoneimine dye, methine dye, cyanine dye, and metal thiolate complex.

Preferred examples of these dyes include cyanine dyes described in JP-A-58-125246, JP-A-59-84356, JP-A-59-202829, and JP-A-60-78787, methine dyes described in JP-A-58-173696, JP-A-58-181690, and JP-A-58-194595, naphthoquinone dyes described in JP-A-58-112793, JP-A-58-224793, JP-A-59-48187, JP-A-59-73996, JP-A-60-52940, and JP-A-60-63744, squarylium dyes described in JP-A-58-112792, and cyanine dyes described in British Patent 434,875.

Further, near infrared absorbing sensitizers described in U.S. Pat. No. 5,156,938 are preferably used. Moreover, substituted arylbenzo(thio)pyrylium salts described in U.S. Pat. No. 3,881,924, trimethinethiapyrylium salts described in JP-A-57-142645 (corresponding to U.S. Pat. No. 4,327, 169), pyrylium salts described in JP-A-181051, JP-A-58-220143, JP-A-59-41363, JP-A-59-84248, JP-A-59-84249, JP-A-59-146063, and JP-A-59-146061, cyanine dyes described in JP-A-59-216146, pentamethinethiopyrylium salts described in U.S. Pat. No. 4,283,475, and pyrylium compounds described in JP-B-5-13514 (The term "JP-B" as used herein means an "examined Japanese patent application") and JP-B-5-19702 are preferably used.

Other preferred examples of the dye employable herein include near infrared absorbing dyes represented by the general formulae (I) and (II) in U.S. Pat. No. 4,756,993.

Particularly preferred among these dyes are cyanine dye, squarylium dye, pyrylium salt, and nickel thiolate complex.

As the pigment to be used in the invention there may be used any of commercially available pigments and pigments described in Handbook of Color Index (C. I.), "Saishin Ganryo Binran (Handbook of Modern Pigments)", compiled by Nihon Ganryo Gijutsu Kyokai (Society of Pigment Technology of Japan), 1977, "Saishin Ganryo Oyo Gijutsu (Applied Technique of Modern Pigments)", CMC, 1986, and "Insatsu Ink Gijutsu (Printing Ink Technique)", CMC, 1984.

Examples of these pigments include black pigment, yellow pigment, orange pigment, brown pigment, red pigment, purple pigment, blue pigment, green pigment, fluorescent pigment, metal powder pigment, and polymer bond dye. Specific examples of these pigments include insoluble azo pigment, azolate pigment, condensed azo pigment, chelate azo pigment, phthalocyanine pigment, anthraquinone pigment, perylene pigment, perynone pigment, thioindigo pigment, quinacridone pigment, dioxazine pigment, isoindolinone pigment, quinophthalone pigment, dyed lake pigment, azine pigment, nitroso pigment, nitro pigment, natural pigment, fluorescent pigment, inorganic pigment, and carbon black. Preferred among these pigments is carbon black.

These pigments may or may not be subjected to surface treatment before use. Possible examples of surface treatment method include method which comprises coating the surface of the pigment with a resin or wax, method which comprises attaching a surface active agent to the surface of the pigment, and method which comprises bonding a reactive material (e.g., silane coupling agent, epoxy compound, polyisocyanate) to the surface of the pigment. The foregoing surface treatment methods are described in "Kinzoku Sekken no Seishitsu to Oyo (The properties and application of metal soap)", Sachi Shobo, "Insatsu Ink Gijutsu (Printing Ink Technique)", CMC, 1984,and "Saishin Ganryo Oyo Gijutsu (Applied Technique of Modern Pigments)", CMC, 1986.

The particle diameter of the pigment is preferably from 0.01 μm to 10 μm, more preferably from 0.05 μm to 1 μm, particularly from 0.1 μm to 1 μm. When the particle diameter of the pigment falls below 0.01 μm, it is disadvantageous in the stability of the dispersion in the coating solution of sensitive composition. On the contrary, when the particle diameter of the pigment exceeds 10 μm, it is disadvantageous in the uniformity of the sensitive layer which has been coated.

The dispersion of the pigment can be carried out by any known dispersion technique for use in the production of ink or toner. Examples of the dispersion machine to be used herein include ultrasonic disperser, sandmill, attritor, pearl mill, supermill, ball mill, impeller, disperser, KD mill, colloid mill, dinatron, three-roll mill, and pressure kneader.

For the details of these dispersion machines, reference can be made to "Saishin Ganryo Oyo Gijutsu (Applied Technique of Modern Pigments)", CMC, 1986.

Such a dye or pigment may be incorporated in the composition of photo-heat conversion compound-encapsulated metal oxide in an amount of from 0.01 to 50% by weight, preferably from 0.1 to 10% by weight, particularly from 0.5 to 10% by weight for dye or from 1.0 to 10% by weight for pigment, based on the solid content of the composition. When the content of the pigment or dye falls below 0.01% by weight, the resulting photo-heat conversion effect is insufficient. On the contrary, when the content of the pigment or dye exceeds 50% by weight, it cannot be encapsulated in the metal oxide.

Particularly preferred dyes among organic photo-heat conversion compounds to be encapsulated in the metal oxide include a dye soluble in water or a dye soluble in a solvent having a high water-solubility such as acetone, THF, methanol, ethanol, isopropanol, methyl ethyl ketone and acetonitrile. Specific examples of such a dye will be given below, but the present invention should not be construed as being limited thereto.

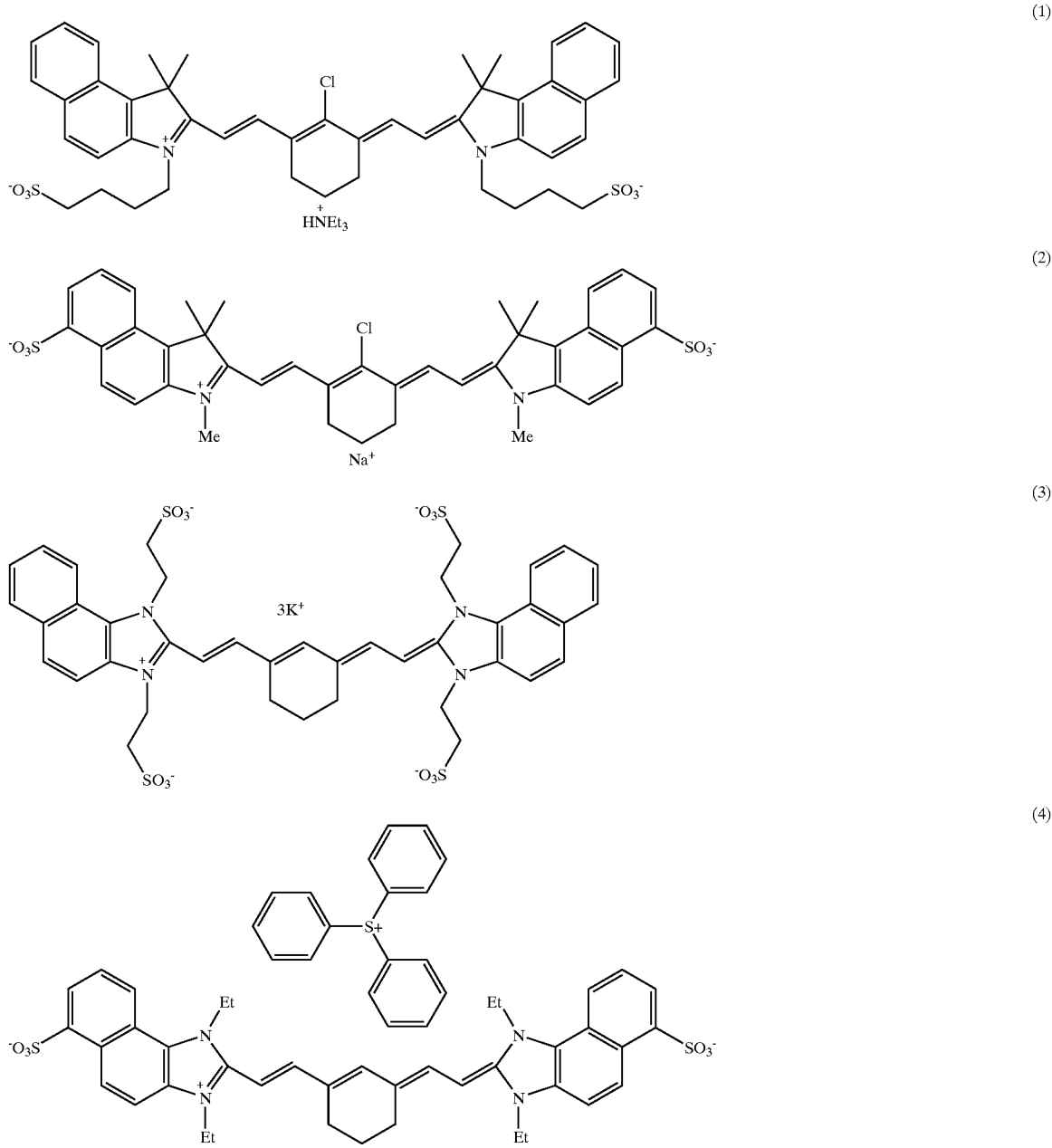

-continued
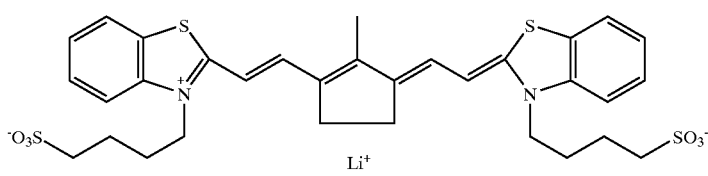
(5)
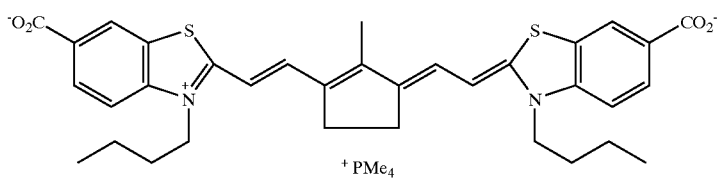
(6)
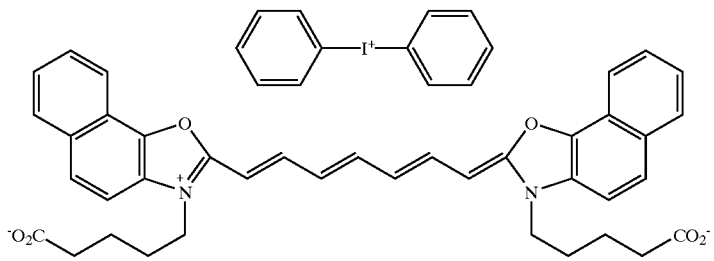
(7)
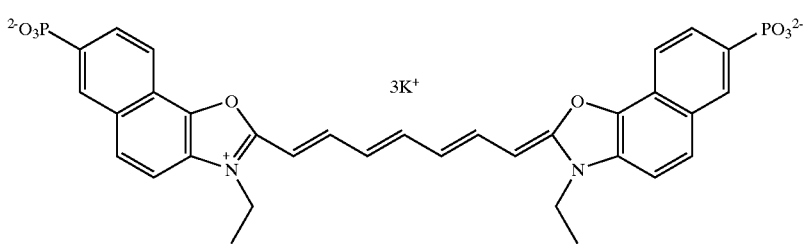
(8)
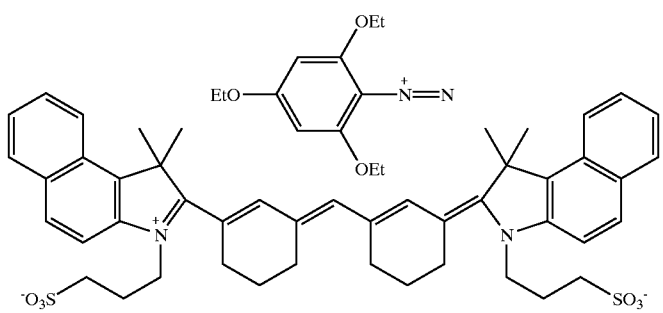
(9)
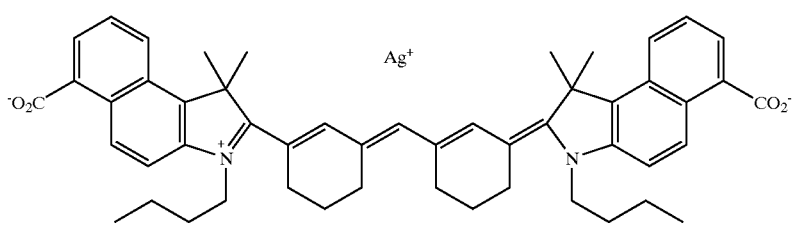
(10)
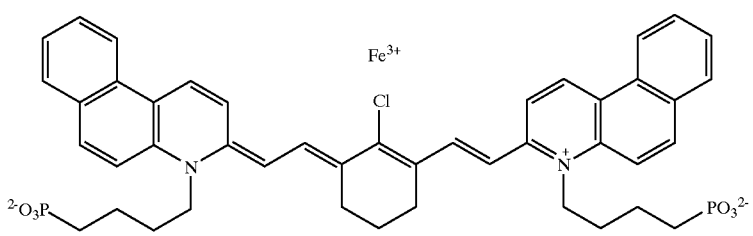
(11)

(12)
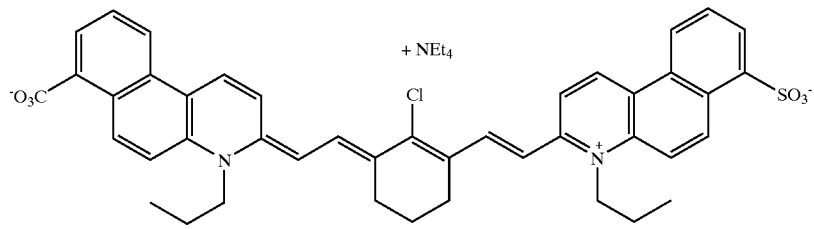
(13)
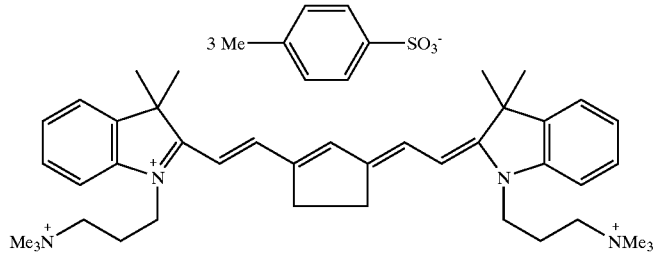
(14)
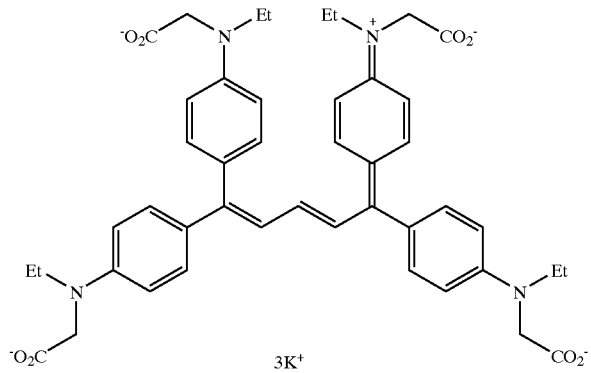
(15)
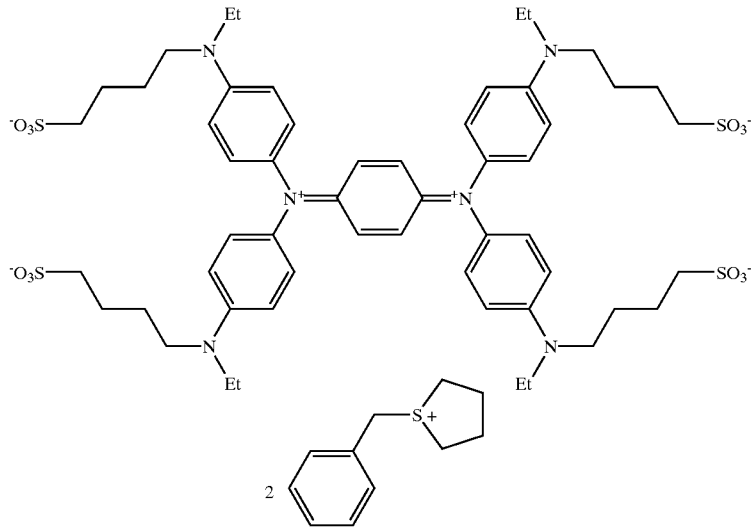

-continued
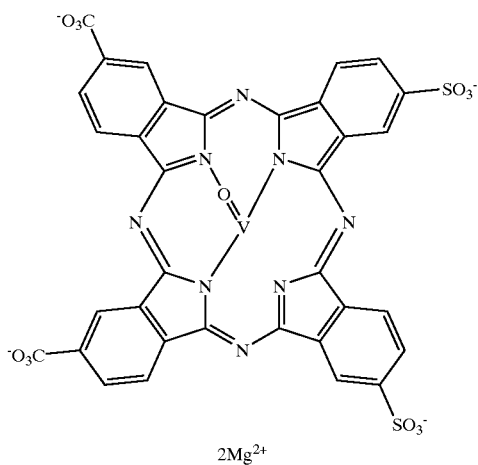
(16)
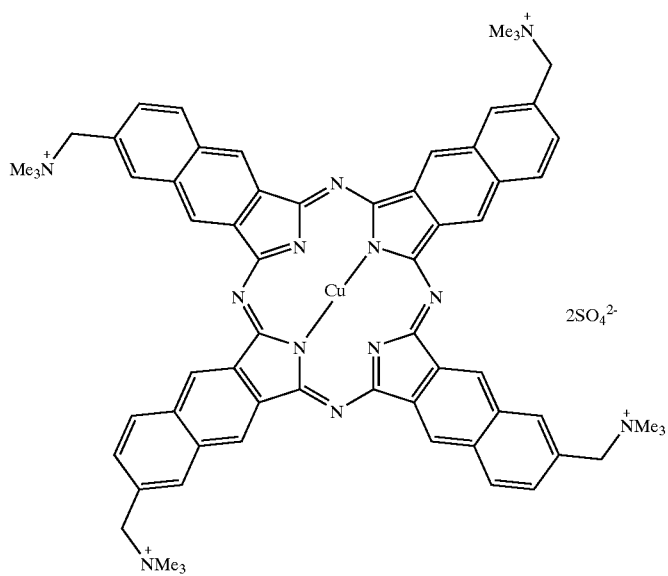
(17)
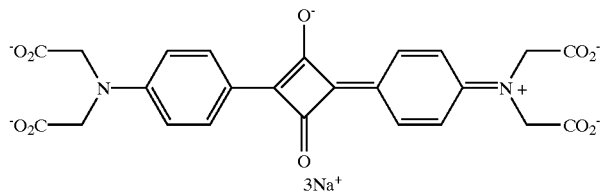
(18)
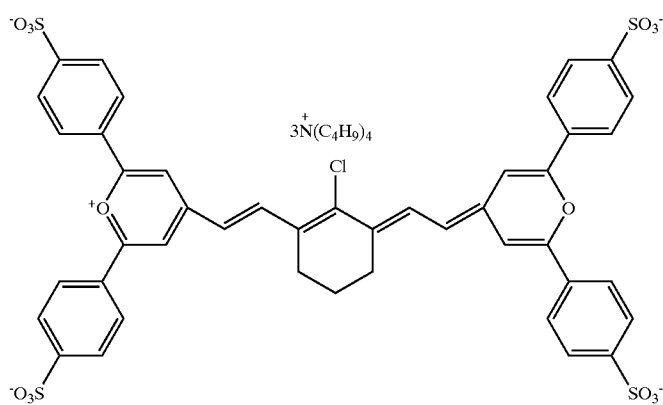
(19)

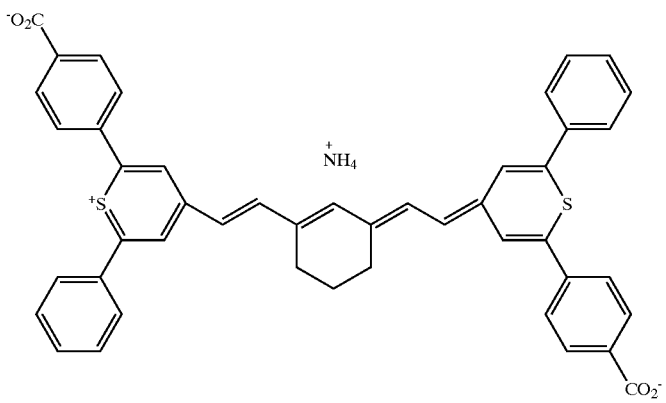

(20)

The size of the photo-heat conversion compound-encapsulated particulate metal compound to be used in the invention is from 0.001 μm to 20 μm, preferably from 0.01 μm to 5 μm, more preferably from 0.05 μm to 2 μm. When the particle diameter of the particulate metal compound is too small, the expected effect cannot be exerted. On the contrary, when the particle diameter of the particulate metal compound is too great, the resulting resolution is deteriorated.

Other Ingredients which can be Incorporated in the Particulate Metal Oxide

In order to enhance the compatibility of the dye with the metal oxide, there can be used a known compatibilizer polymer capable of enhancing the compatibility of the two components. Examples of the known compatibilizer polymer employable herein include polyoxazoline polymer, polyvinyl pyrrolidone, and polyacrylamide derivative polymer as described in Yoshiki Nakajo, "Kagaku to Kogyo (Chemistry and Industry)", vol. 46, page 1567, 1993. Further, polar group-containing organic polymers as described in JP-A-8-262700 may be used. The amount of the compatibilizer polymer to be incorporated is from 0.5 to 70% by weight, preferably from 1 to 50% by weight, more preferably from 5 to 30% by weight based on the weight of the metal oxide. When the amount of the compatibilizer polymer falls below 0.5% by weight, the expected effect cannot be exerted. On the contrary, when the amount of the compatibilizer polymer exceeds 70% by weight, the desired metal oxide cannot be formed.

2. Binder (Polymer Compound which can Decompose when Acted Upon by Heat or Acid to become Water-soluble or Alkali-soluble)

The polymer compound which can be used in the invention is a polymer compound which becomes water-soluble or alkali-soluble when acted upon by either or both of heat and acid. Examples of such a compound which becomes water-soluble or alkali-soluble when acted upon by heat or acid include sulfonic acid ester polymer, and carboxylic acid ester polymer.

As the sulfonic acid ester polymer there may be used a polymer described in JP-A-10-282672. As the carboxylic acid ester polymer there may be used t-alkylcarboxylic acid ester, carboxylic acid benzyl ester or alkoxyalkyl ester described in JP-A-7-186562. Particularly preferred among these compounds are sulfonic acid ester represented by the general formula (1) described in claim 1 of JP-A-10-282672, and t-alkylcarboxylic acid ester, carboxylic acid benzyl ester and carboxylic acid pyranyl ester described in Claim 3 of JP-A-10-186562.

Specific examples of the polymer compound to be used in the invention which decomposes when acted by heat or acid to become water-soluble or alkali-soluble include sulfonic acid ester polymers 1p-1 to 1p-8, and carboxylic acid ester polymers a1 to a10 shown below, but the present invention should not be construed as being limited thereto.

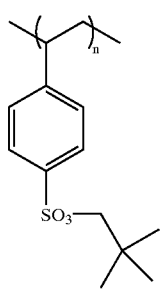

(1p-1)

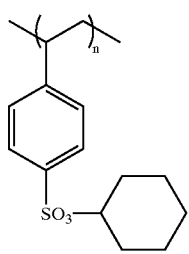

(1p-2)

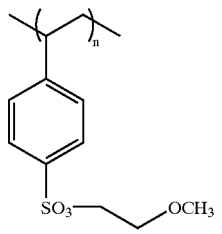

(1p-3)

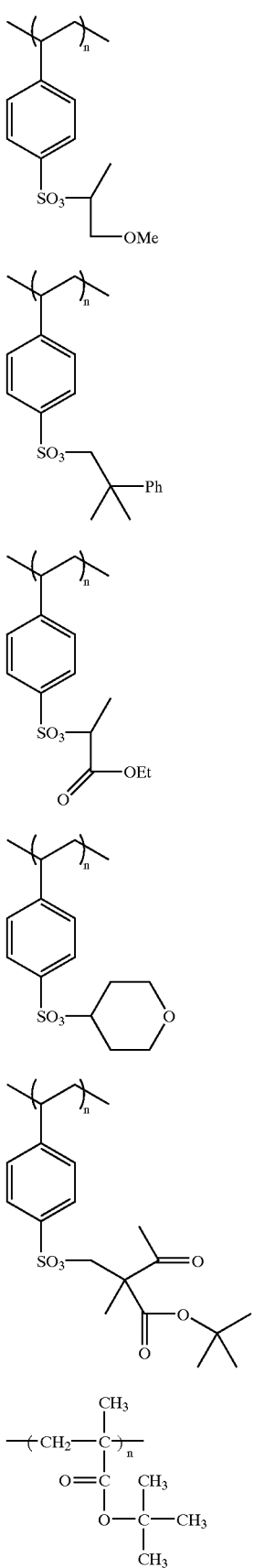
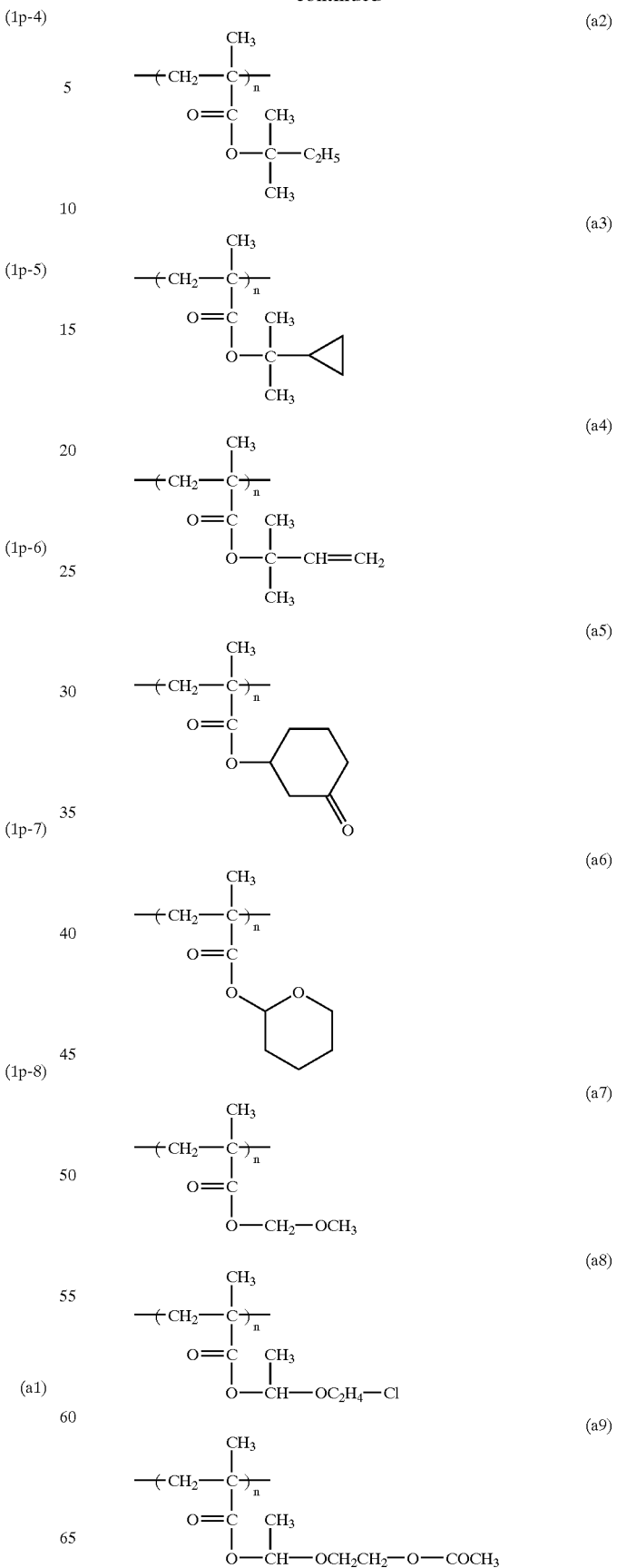

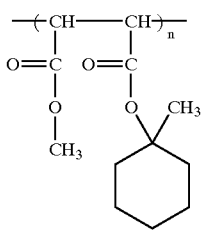
(a10)

The amount of the polymer compound which decomposes when acted upon by heat or acid to become water-soluble or alkali-soluble, if used, is from 3 to 98% by weight, preferably from 5 to 80% by weight, particularly from 10 to 60% by weight based on the total solid content in the sensitive layer. When the content of the polymer compound which decomposes when acted upon by heat or acid to become water-soluble or alkali-soluble falls below 3% by weight, it is disadvantageous in image forming properties. On the contrary, when the content exceeds 98% by weight, it is disadvantageous in the sensitivity of polarity conversion.

A particularly preferred binder to be used in the invention is a crosslinked compound having a functional group which changes from hydrophobic to hydrophilic when acted upon by acid, radiation or heat.

The term "to change from hydrophobic to hydrophilic" as used herein is meant to indicate a definite change of hydrophilicity to an extent such that the desired function of the printing surface of lithographic printing plate can be accomplished. Preferably, the change of hydrophilicity is such that the contact angle of the compound with water droplet in the air decreases by 15° or more. In other words, such a compound preferably shows a decrease of 15° or more in the contact angle with water droplet in the air when acted upon by acid, radiation or heat to become hydrophilic from hydrophobic. More preferably, such a compound shows a decrease of 40° or more in the contact angle with water droplet in the air. Preferably, such a compound initially shows a contact angle of 60° or more with water droplet in the air but shows a drop of the contact angle to 20° or less when acted upon by acid, radiation or heat.

In the present invention, any compound having the foregoing properties can be used as a binder. Such a compound may be crosslinked by any crosslinking method such as photo-crosslinking method, photopolymerization and photo-decomposition polymerization (condensation).

The photo-crosslinking of the compound is carried out by photo-dimerization or photo-radical polymerization. In some detail, a crosslinking reactive group is incorporated in the polymer compound which reacts with itself or with a monomer to undergo crosslinking.

The photo-dimerization reaction involves absorption of light by the functional group contained therein or irradiation with light using a photosensitizer to cause crosslinking reaction.

The photo-radical polymerization crosslinking involves irradiation with light using a well-known photopolymerization initiator to cause crosslinking reaction.

The polymer to be crosslinked by photo-crosslinking reaction can be obtained by the copolymerization of a monomer having a photo-crosslinkable functional group, i.e., photo-curing functional group with a monomer having a group which changes in its hydrophilicity when acted upon by heat.

The term "photo-curing functional group" as used herein is meant to indicate a functional group which causes curing reaction of resin when acted upon by light.

Specific examples of the photo-curing functional group employable herein include functional groups to be incorporated in conventional known photosensitive resins cited as photo-curing resins in general remarks such as Hideo Inui and Gentaro Nagamatsu, "Kankosei Kobunshi (Photosensitive Polymer)", Kodansha, 1977, Takahiro Tsunoda, "Shinkankosei Jushi (New Photosensitive Resins)", Insatsu Gakkai Shuppanbu Co., Ltd., 1981, G. E. Green and B. P. Strak, "J. Macro. Sci. Reas. Macro. Chem.", C21(2), pp. 187–273 (1981–1982) and C. G. Rattey, "Photopolymerization of Surface Coatings", A. Wiley Inter Science Pub., 1982.

Examples of these functional groups include polymerizable double bond group and photo-crosslinkable double bond group.

Specific examples of the polymerizable double bond group employable herein include groups represented by $CH_2=CH-$, $CH_2=CHCH_2-$, $CH_2=CHCOO-$, $CH_2=C(CH_3)COO-$, $C(CH_3)H=CHCOO-$, $CH_2=CHCONH-$, $CH_2=C(CH_3)CONH-$, $C(CH_3)H=CHCONH-$, $CH_2=CHOCO-$, $CH_2=C(CH_3)OCO-$, $CH_2=CHCH_2OCO-$, $CH_2=CHNHCO-$, $CH_2=CHCH_2NHCO-$, $CH2=CHSO_2-$, $CH_2=CHCO-$, $CH_2=CHO-$ and $CH_2=CHS-$.

Specific examples of the photo-crosslinking double bond group include $-CH=CH-$, and $-C(CH_3)=C(CH_3)-$.

Particularly preferred examples of the functional group include 1,2-dimethyl-maleimide group, and vinylphenyl group.

A specific example of the compound crosslinked by photopolymerization reaction is a polymer compound obtained by the photo-radical polymerization of a monomer having as a functional group a group which changes from hydrophobic to hydrophilic when acted upon by acid, radiation or heat as described in JP-A-10-282672, pp. 4–19.

Specific preferred examples of the polymer compound polymerized and crosslinked by photopolymerization include compounds having sulfonic acid ester group and/or alkoxyalkylester group, i.e., functional group X.

Specific examples of the functional group X will be described in detail below.

The sulfonic acid ester group can be represented by the following general formula (2):

wherein $L^2$ represents an organic group formed by polyvalent non-metallic atoms required to connect the functional group represented by the general formula (2) to the polymer skeleton; and $R_{11}$ represents a substituted or unsubstituted aryl group, a substituted or unsubstituted alkyl group or a cyclic imide group.

The unsubstituted aryl group or substituted aryl group represented by $R_{11}$ contains a carbon ring aryl group and a heterocyclic aryl group. Examples of the carbon ring aryl group include a $C_{6-19}$ carbon ring aryl group such as phenyl group, naphthyl group, anthracenyl group and pyrenyl group. Examples of the heterocyclic aryl group include one having from 3 to 20 carbon atoms and from 1 to 5 heteroatoms such as pyridyl group, furyl group, quinolyl group obtained by condensation of benzene rings, benzofuryl group, thioxanthone group and carbazole group. Examples of the alkyl group moiety in the alkyl group or substituted alkyl group represented by $R_{11}$ include straight-chain, branched or cyclic $C_{1-25}$ alkyl group such as methyl group, ethyl group, isopropyl group, t-butyl group and cyclohexyl group.

Examples of the substituents on the substituted aryl, heteroaryl or alkyl group represented by $R_{11}$ include $C_{1-10}$ alkoxy group such as methoxy group and ethoxy group; halogen atom such as fluorine, chlorine and bromine; halogen-substituted alkyl group such as trifluoromethyl group and trichloromethyl group; $C_{2-15}$ alkoxycarbonyl or aryloxycarbonyl group such as methoxycarbonyl group, ethoxycarbonyl group, t-butyloxycarbonyl group and p-chlorophenyloxycarbonyl group; hydroxyl group; acyloxy group such as acetyloxy group, benzoyloxy group and p-diphenylaminobenzoyloxy group; carbonate group such as t-butyloxycarbonylmethyloxy group; ether group such as t-butyloxycarbonylmethyloxy group and 2-pyranyloxy group; substituted or unsubstituted amino group such as amino group, dimethylamino group, diphenylamino group, morpholino group and acetylamino group; thioether group such as methylthio group and phenylthio group; alkenyl group such as vinyl group and styryl group; nitro group; cyano group; acyl group such as formyl group, acetyl group and benzoyl group; aryl group such as phenyl group and naphthyl group; and heteroaryl group such as pyridyl group. Examples of the substituents on the substituted aryl or heteroaryl group represented by $R_{11}$ include those described above, and alkyl group such as methyl group and ethyl group.

Examples of the cyclic imide group represented by $R_{11}$ include $C_{4-20}$ cyclic imide such as succinic acid imide, phthalic acid imide, cyclohexanedicarboxylic acid imide, and norbornenedicarboxylic acid imide.

Particularly preferred among the groups represented by are aryl group substituted by electrophilic group such as halogen, cyano and nitro, alkyl group substituted by electrophilic group such as halogen, cyano and nitro, secondary or tertiary branched alkyl group, cyclic alkyl group, and cyclic imide group.

The polyvalent connecting group formed by non-metallic atoms represented by $L^2$ is formed by from 1 to 60 carbon atoms, from 0 to 10 nitrogen atoms, from 0 to 50 oxygen atoms, from 1 to 100 hydrogen atoms and from 0 to 20 sulfur atoms. Specific examples of the connecting group include those formed by the combination of the following structural units:

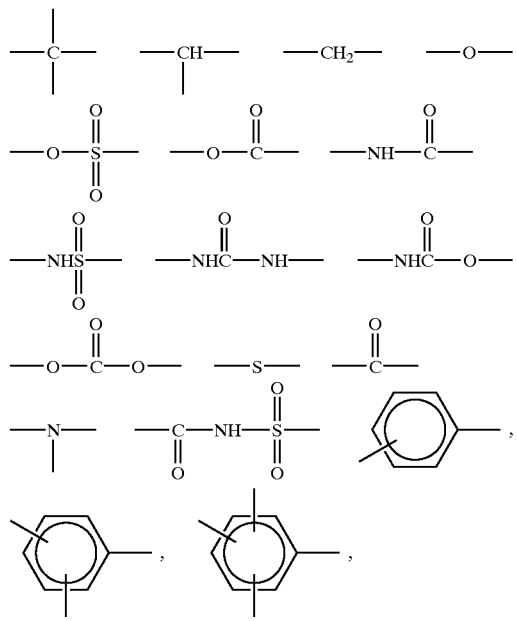

polyvalent naphthalene, and polyvalent anthracene.
Examples of substituents on the substituted polyvalent connecting group include $C_{1-20}$ alkyl group such as methyl group and ethyl group, $C_{6-16}$ aryl group such as phenyl group and naphthyl group, hydroxyl group, carboxyl group, sulfonamide group, N-sulfonylamide group, $C_{1-6}$ acyloxy group such as acetoxy group, $C_{1-6}$ alkoxy group such as methoxy group and ethoxy group, halogen atom such as chlorine and bromine, $C_{2-7}$ alkoxycarbonyl group such as methoxycarbonyl group, ethoxycarbonyl group and cyclohexyloxycarbonyl group, cyano group, and carbonic acid ester group such as t-butyl carbonate.

The alkoxyalkylester group can be represented by the following general formula (3):

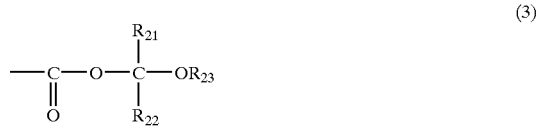

(3)

wherein $R_{23}$ represents a hydrogen atom; $R_{22}$ represents a hydrogen atom or an alkyl group having 18 or less carbon atoms; and $R_{23}$ represents an alkyl group having 18 or less carbon atoms. Two of $R_{21}$, $R_2$ and $R_{23}$ may be connected to each other to form a ring. It is particularly preferred that $R_{22}$ and $R_{23}$ be connected to each other to form a 5- or 6-membered ring.

In the present invention, as the functional group X there may be used one represented by the foregoing general formula (2) or (3). Particularly preferred among these functional groups is sulfonic acid ester group represented by the general formula (2).

Specific examples of the monomer having a functional group represented by the general formula (2) or (3) suitable for the synthesis of the binder of the invention will be given below.

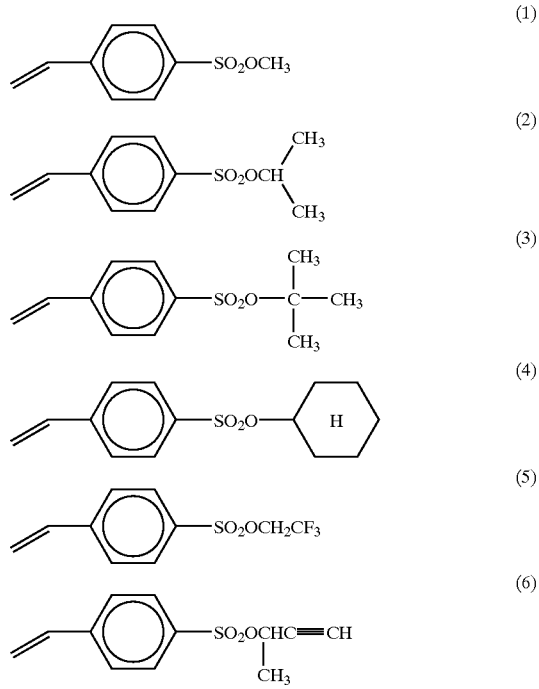

(7) 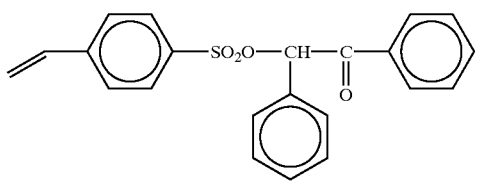

(8) 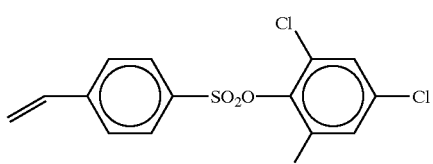

(9) 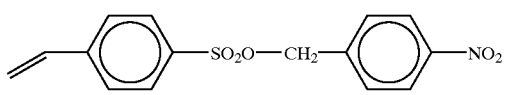

(10) 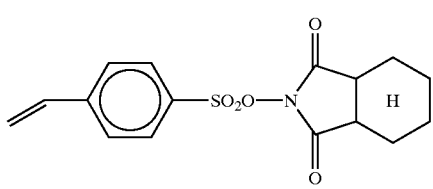

(11) 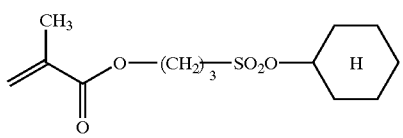

(12) 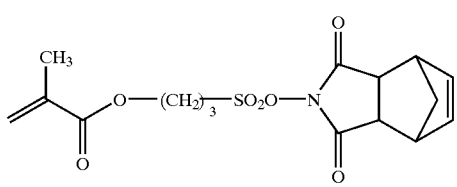

(13) 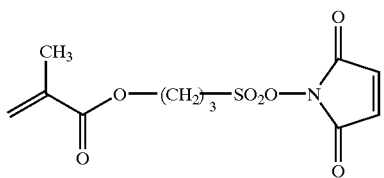

(14) 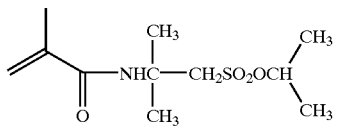

(15) 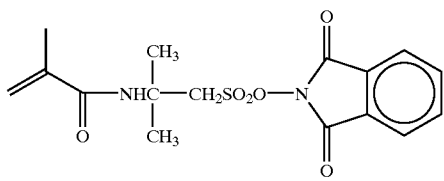

(16) 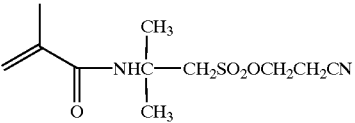

(17) 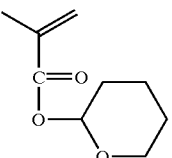

As the binder there is preferably used a polymer compound obtained by the radical polymerization of at least one of monomers having a functional group represented by the foregoing general formula (2) or (3). As such a polymer compound there may be used a homopolymer comprising only one of monomers having a functional group represented by the general formula (2) or (3). However, a copolymer comprising two or more of these monomers or a copolymer of these monomers with other monomers may be used.

Other preferred examples of monomers include crosslinking-reactive monomers such as glycidyl methacrylate, N-methylol methacrylamide and 2-isocyanate ethyl acrylate.

Other examples of monomers to be used in the copolymer include known monomers such as acrylic acid esters, methacrylic acid esters, acrylamides, methacrylamides, vinyl esters, styrenes, acrylic acid, methacrylic acid, acrylonitrile, maleic anhydride and maleimic acid imide.

Specific examples of acrylic acid esters include methyl acrylate, ethyl acrylate, (n- or i-)propyl acrylate, (n-, i-, sec-or t-)butyl acrylate, amyl acrylate, 2-ethylhexyl acrylate, dodecyl acrylate, chloroethyl acrylate, 2-hydroxyethyl acrylate, 2-hydroxypropyl acrylate, 5-hydroxypentyl acrylate, cyclohexyl acrylate, allyl acrylate, trimethylolpropane monoacrylate, pentaerythritol monoacrylate, benzyl acrylate, methoxybenzyl acrylate, chlorobenzyl acrylate, hydroxybenzyl acrylate, hydroxyphenethyl acrylate, dihydroxyphenethyl acrylate, fufuryl acrylate, tetrahydrofurfuryl acrylate, phenyl acrylate, hydroxyphenyl acrylate, chlorophenyl acrylate, sulfamoylphenyl acrylate, and 2-(hydroxyphenylcarbonyloxy)ethyl acrylate.

Specific examples of methacrylic acid esters include methyl methacrylate, ethyl methacrylate, (n- or i-)propyl methacrylate, (n-, i-, sec- or t-)butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 5-hydroxypentyl methacrylate, cyclohexyl methacrylate, allyl methacrylate, trimethylolpropane monomethacrylate, pentaerythritol monomethacrylate, glycidyl methacrylate, benzyl methacrylate, methoxybenzyl methacrylate, chlorobenzyl methacrylate, hydroxybenzyl methacrylate, hydroxyphenethyl methacrylate, dihydroxyphenethyl methacrylate, furfuryl methacrylate, tetrahydrofurfuryl methacrylate, phenyl methacrylate, hydroxyphenyl methacrylate, chlorophenyl methacrylate, sulfamoylphenyl methacrylate, and 2-(hydroxyphenyl carbonyloxy)ethyl methacrylate.

Specific examples of acrylamides include acrylamide, N-methylacrylamide, N-ethylacrylamide, N-propylacrylamide, N-butylacrylamide, N-benzylacrylamide, N-hydroxyethylacrylamide, N-phenyl acrylamide, N-tollylacrylamide, N-(hydroxyphenyl) acrylamide, N-(sulfamoylphenyl)acrylamide, N-(phenylsulfonyl)acrylamide, N-(tollylsulfonyl) acrylamide, N,N-dimethylacrylamide, N-methyl-N-phenylacrylamide, and N-hydroxyethyl-N-methylacrylamide.

Specific examples of methacrylamides include methacrylamide, N-methylmethacrylamide, N-ethyl methacrylamide, N-propylmethacrylamide, N-butyl methacrylamide, N-benylmethacrylamide, N-hydroxyethyl methacrylamide, N-phenylmethacrylamide, N-tollyl methacrylamide, N-(hydroxyphenyl)methacrylamide, N-(sulfamoylphenyl)methacrylamide, N-(phenylsulfonyl) methacrylamide, N-(tollylsulfonyl)methacrylamide, N,N-dimethylmethacrylamide, N-methyl-N-phenylmethacrylamide, and N-hydroxyethyl-N-methyl methacrylamide.

Specific examples of vinyl esters include vinyl acetate, vinyl butyrate and vinyl benzoate.

Specific examples of styrenes include styrene, methyl styrene, dimethylstyrene, trimethylstyrene, ethylstyrene, propylstyrene, cyclohexylstyrene, chloromethylstyrene, trifluoromethylstyrene, ethoxymethylstyrene, acetoxymethyl styrene, methoxystyrene, dimethoxystyrene, chlorostyrene, dichlorostyrene, bromostyrene, iodostyrene, fluorostyrene, and carboxystyrene.

Particularly preferred among these other monomers are acrylic acid esters, methacrylic acid esters, acrylamides, methacrylamides, vinyl esters, styrenes, acrylic acid, methacrylic acid and acrylonitrile having 20 or less carbon atoms.

The proportion of the functional group represented by the general formula (2) or (3) to be used in the synthesis of the copolymer is preferably from 5 to 99% by weight, more preferably from 10 to 95% by weight based on the total weight of monomers.

The binder crosslinked by photodecomposition polymerization to be used in the invention will be further described hereinafter. A particularly preferred example of the binder is the previously mentioned compound A.

The compound A is a compound having at least one functional group selected from the group consisting of —OH, —NH$_2$, —COOH, —NH—CO—R$_3$ and —Si(OR$_4$)$_3$ (in which R$_3$ and R$_4$ each represent an alkyl or aryl group, with the proviso that when the compound having these functional groups have both R$_3$ and R$_4$, they may be the same or different), i.e., functional group Y together with the previously mentioned functional X in the same molecule.

Specific examples of the functional group Y will be described in detail hereinafter.

When the functional group Y is —NH—CO—R$_3$ and/or —Si(OR$_4$)$_3$, R$_3$ and R$_4$ are each preferably a C$_{1-10}$ alkyl group or C$_{6-20}$ aryl group which may be substituted by halogen such as chlorine, alkoxy group such as methoxy group or alkoxycarbonyl group such as methoxycarbonyl group. Specific examples of —NH—CO—R$_3$ include —NH—CO—CH$_3$, and —NH—CO—C$_2$H$_5$. Specific examples of —Si(OR$_4$)$_3$ include —Si(OCH$_3$)$_3$, and —Si(OC$_2$H$_5$)$_3$.

As the compound A to be used in the invention there may be used a polymer compound obtained by the radical polymerization of at least one of monomers having a functional group X, preferably a functional group represented by the general formula (2) or (3), with a monomer having a functional group Y. As such a compound A there may be used a copolymer comprising only one of monomers having a functional group represented by the general formula (2) or (3) and only one of the foregoing monomer shaving a functional group Y. A copolymer comprising two or more of either or both of the two monomer groups or a copolymer of these monomers with other monomers may be used.

The foregoing other monomers are the same as those described as monomers which can be copolymerized with the monomer having a functional group X.

The weight proportion of the monomer having a functional group X and the monomer having a functional group Y to be used in the synthesis of the copolymer is preferably from 10:90 to 99:1, more preferably from 30:70 to 97:3.

In the case where a copolymer with other monomers is used, the proportion of the other monomers to the sum of the monomer having a functional group X and the monomer having a functional group Y to be used in the synthesis of the copolymer is preferably from 5 to 99% by weight, more preferably from 10 to 95% by weight.

Specific examples of the polymer compound to be used as a binder in the invention, including the compound A, will be given below. In the following chemical formulae, the figure attached to the right end of the bottom of braces indicates the percent copolymerization.

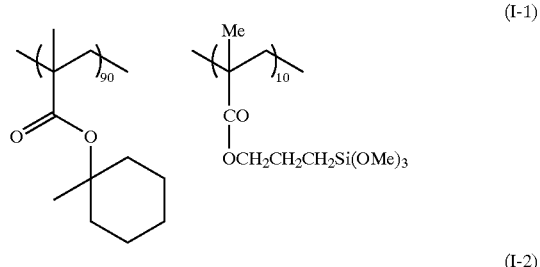

(I-1)

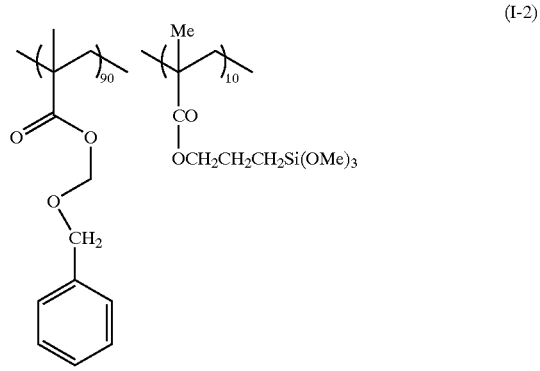

(I-2)

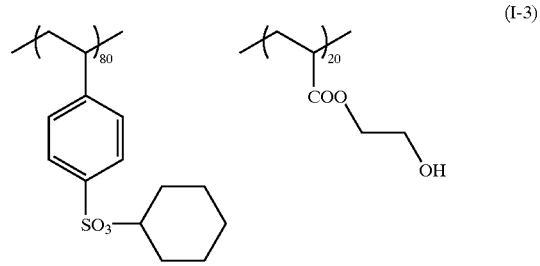

(I-3)

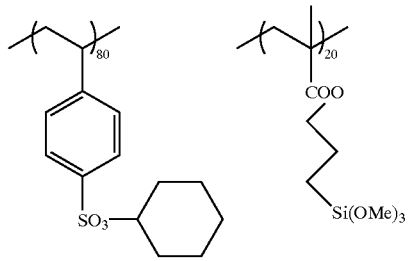
(I-4)
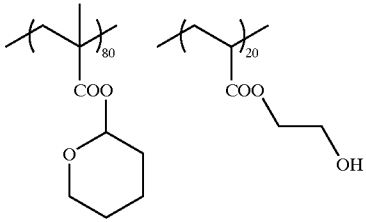
(I-10)
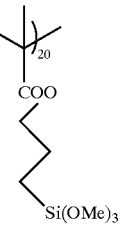
(I-5)
(I-11)
(I-6)
(I-12)
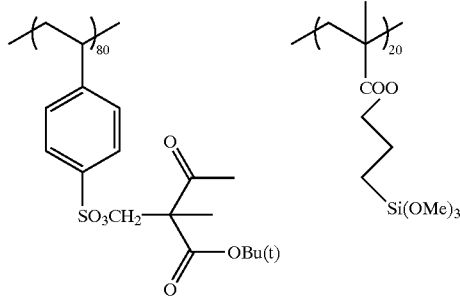
(I-7)
(I-13)
(I-8)
(I-14)
(I-9)
(I-15)

(I-16)
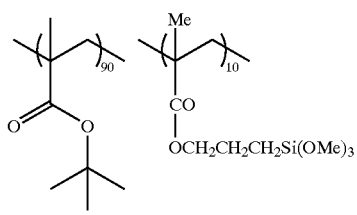
(I-17)
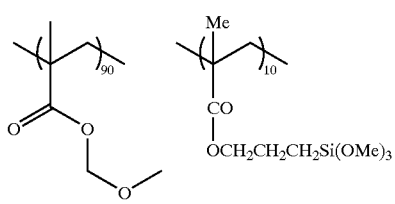
(I-18)
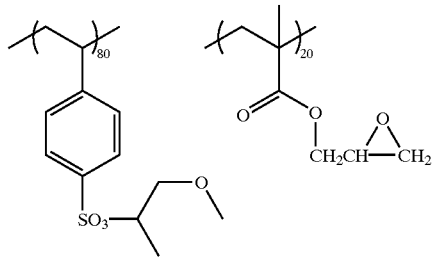
(I-19)
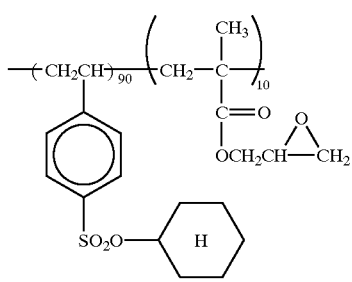
(I-20)
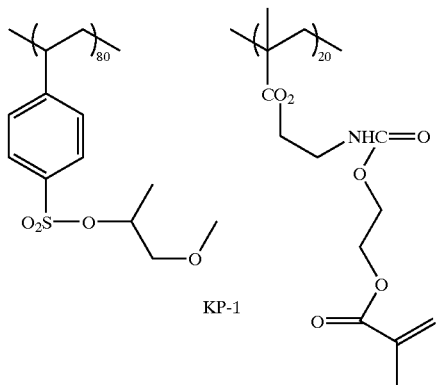
KP-1
(I-21)
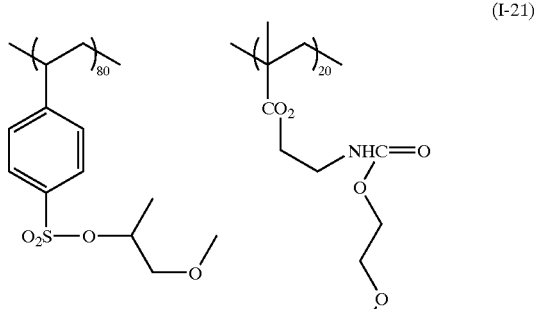
KP-2
(I-22)
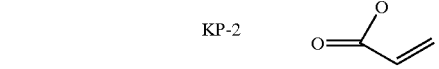
KP-3
(I-23)
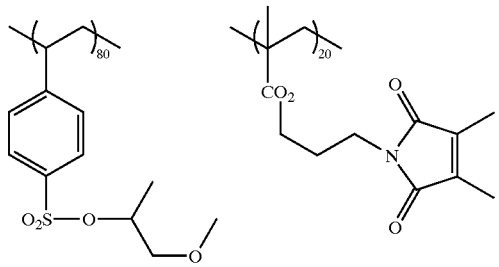
KP-4
(I-24)
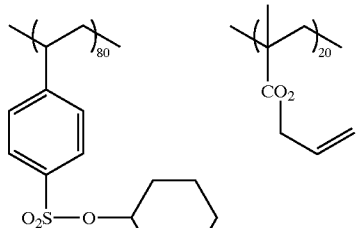
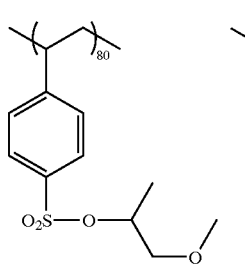
KP-5

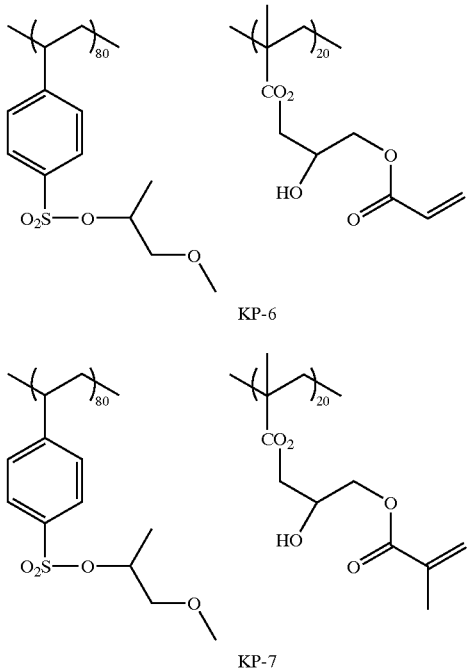

KP-6

KP-7

Hydrolysis-polymerizable Compound

The hydrolysis-polymerizable compound to be used in the invention will be further described hereinafter.

The hydrolysis-polymerizable compound to be used in the invention is a compound represented by the following general formula (1).

$$(R_1)_n - X - (OR_2)_{4-n} \quad (1)$$

wherein $R_1$ and $R_2$ may be the same or different and each represent an alkyl or aryl group; X represents Si, Al, Ti or Zr; and n represents an integer of from 0 to 2. The alkyl group represented by $R_1$ or $R_2$ preferably has from 1 to 4 carbon atoms. The alkyl or aryl group represented by $R_1$ or $R_2$ may have substituents. The hydrolysis-polymerizable compound is preferably a low-molecular weight compound having a molecular weight as low as 1,000 or less.

Examples of the hydrolysis-polymerizable compound containing aluminum include trimethoxy aluminate, triethoxy aluminate, tripropoxy aluminate, and tetraethoxy aluminate. Examples of the hydrolysis-polymerizable compound containing titanium include trimethoxy titanate, tetramethoxy titanate, triethoxy titanate, tetraethoxy titanate, tetrapropoxy titanate, chlorotrimethoxytitanate, chlorotriethoxytitanate, ethyltrimethoxy titanate, methyltriethoxy titanate, ethyltriethoxy titanate, diethyldiethoxy titanate, phenyltrimethoxy titanate, and phenyltriethoxy titanate. Examples of those containing zirconium among the foregoing hydrolysis-polymerizable compounds include those described with reference to compounds containing titanium except that titanate is replaced by zirconate.

Examples of the hydrolysis-polymerizable compound containing silicon include trimethoxy silane, triethoxy silane, tripropoxy silane, tetramethoxy silane, tetraethoxy silane, tetrapropoxy silane, methyltrimethoxy silane, ethyltrimethoxy silane, propyltrimethoxy silane, dimethyldimethoxy silane, diethyldiethoxy silane, γ-chloropropyltriethoxy silane, γ-mercaptopropyltrimethoxy silane, γ-mercaptopropyltriethoxy silane, γ-aminopropyltriethoxy silane, phenyltrimethoxy silane, phenyltriethoxy silane, phenyltripropoxy silane, diphenyldimethoxy silane, and diphenyldiethoxy silane. Preferred among these hydrolysis-polymerizable compounds are tetramethoxy silane, tetraethoxy silane, methyltrimethoxy silane, ethyltrimethoxy silane, methyltriethoxy silane, ethyltriethoxy silane, dimethyldimethoxy silane, phenyltrimethoxy silane, phenyltriethoxy silane, diphenyldimethoxy silane, and diphenyldiethoxy silane.

These hydrolysis-polymerizable compounds may be used singly or in combination of two or more thereof. These hydrolysis-polymerizable compounds may be partly subjected to hydrolysis followed by dehydration condensation. In order to adjust the physical properties of the reaction product, trialkyl monoalkoxy silane may be added as necessary. The hydrolysis-polymerizable compound is a compound which forms an inorganic phase in the image-forming material of the invention. In order to enhance the storage stability of the image-forming material in the form of solution before application to the substrate of the lithographic printing plate precursor, it is effective that the hydrolysis-polymerizable compound protects an active metal hydroxide group, e.g., silanol group (Si—OH), in partially hydrolysis-polymerized inorganic polymer. The protection of silanol group can be accomplished by esterifying a silanol group with a higher alcohol such as t-butanol and i-propyl alcohol (Si—OR). In some detail, it can be carried out by adding the foregoing higher alcohol to the inorganic phase. By making the use of the properties of the inorganic phase, e.g., heating the inorganic phase and then distilling separated water off so that the inorganic phase is dehydrated, the storage stability of the printing plate precursor can be further enhanced. If an acid such as hydrochloric acid and base such as ammonia which can act as a catalyst for the hydrolysis polymerization is present in the inorganic phase, it is generally effective to lower the concentration of these acids or bases. This can be easily accomplished by neutralizing the inorganic phase with an acid or base.

The foregoing hydrolysis-polymerizable compound is used in an amount of preferably from 3 to 95% by weight, more preferably from 10 to 80% by weight based on the total solid content in the sensitive layer.

3. Other Constituents of Radiation-sensitive Layer (1) Particulate Water-insoluble Solid A particulate water-soluble solid which is not a necessary component for the constituent layer of the radiation-sensitive lithographic printing plate precursor of the invention but may be used for the purpose of adjusting the physical strength and hydrophilicity of the sensitive layer and like purposes will be described hereinafter. The particulate water-insoluble solid is at least one particulate solid selected from the group consisting of particulate inorganic material, particulate organic material and particulate metal.

As the particulate water-insoluble solid there is preferably used a particulate material which exhibits a good affinity for and adhesion to the foregoing binder and thus improves the water retention thereof. A particulate material which has been subjected to surface treatment to improve the dispersibility thereof may be used. These particulate inorganic material, particulate organic material and particulate metal may be used in proper combination.

Examples of the foregoing inorganic material employable in particulate form herein include metal oxide such as iron oxide, zinc oxide, titanium dioxide and zirconia, silicon-containing oxide also called white carbon which has no absorption in the visible range itself such as silicic anhydride, hydrous calcium silicate and hydrous aluminum silicate, and mineral clay such as clay, talc, kaolin and zeolite.

As the particulate metal there may be used particulate iron, aluminum, copper, nickel or silver.

The average particle diameter of the foregoing particulate inorganic material or metal is 10 μm or less, preferably from 0.01 μm to 10 μm, more preferably from 0.1 μm to 5 μm. When the average particle diameter of the foregoing particulate inorganic material or metal falls below 0.01 μm, the area irradiated with laser beam exhibits an insufficient water retention, easily causing scumming. On the contrary, when the average particle diameter of the foregoing particulate inorganic material or metal exceeds 10 μm, the resulting printed matter has a deteriorated resolution. Further, the resulting particulate inorganic material or metal exhibits a deteriorated adhesion to the support. Moreover, the particulate material present in the vicinity of the surface of the support can be easily peeled.

The content of the foregoing inorganic particulate material or metal, if incorporated in the sensitive layer, is from about 2 to 90% by volume, preferably from 5 to 80% by volume, more preferably from 10 to 50% by volume based on the total solid content in the sensitive layer. When the content of the inorganic particulate material or metal falls below 2% by volume, the surface of the radiation-sensitive lithographic printing plate precursor exhibits an insufficient water retention on the area irradiated with laser beam, easily causing scumming. On the contrary, when the content of the inorganic particulate material or metal exceeds 90% by volume, the resulting coating film exhibits a deteriorated strength that shortens press life. Further, the adhesion between the coat layer and the support is deteriorated.

The foregoing organic particulate material employable herein is not specifically limited so far as it enhances the water retention of the lithographic printing plate precursor. In practice, however, as a granular organic material there may be used a particulate resin. The use of such a particulate resin requires that the following precautions be given. When a solvent is used to disperse the particulate resin, it is necessary that a particulate resin insoluble in the solvent be selected or a solvent which doesn't dissolve the particulate resin therein be selected. When the particulate resin is dispersed in the coating solution of coating film in the presence of a thermoplastic polymer, it is necessary that a thermoplastic polymer which doesn't undergo melting, deformation or decomposition when acted upon by heat developed by dispersion be selected.

In order to lessen the necessity for these precautions, a crosslinked particulate resin may be preferably used.

The average particle diameter of the foregoing organic particulate material is from about 0.01 μm to 10 μm, preferably from 0.05 μm to 10 μm, more preferably from 0.1 μm to 5 μm. When the average particle diameter of the organic particulate material falls below 0.01 μm, the area irradiated with laser beam exhibits an insufficient water retention, easily causing scumming. On the contrary, when the average particle diameter of the organic particulate material exceeds 10 μm, the resulting printed matter has a deteriorated resolution. Further, the resulting particulate organic material or metal exhibits a deteriorated adhesion to the support. Moreover, the particulate material present in the vicinity of the surface of the support can be easily peeled.

The content of the foregoing organic particulate material, if incorporated in the sensitive layer, is from about 3 to 70% by volume, preferably from 5 to 60% by volume, more preferably from 10 to 50% by volume based on the total solid content in the sensitive layer. When the content of the organic particulate material falls below 3% by volume, the resulting radiation-sensitive lithographic printing plate precursor exhibits an insufficient water retention, easily causing scumming. On the contrary, when the content of the organic particulate material exceeds 70% by volume, the sensitive layer exhibits a deteriorated strength that shortens press life. Further, the adhesion between the sensitive layer and the support is deteriorated.

Examples of the foregoing organic particulate material include particulate polystyrene (particle diameter: 4 μm to 10 μm), and particulate silicone resin (particle diameter: 2 μm to 4 μm). Examples of the crosslinked particulate resin include microgel of acrylic resin such as microgel comprising two or more ethylenically unsaturated monomers (particle diameter: 0.01 μm to 1 μm), crosslinked polystyrene such as crosslinked particulate resin comprising styrene and divinylbenzdene (particle diameter: 4 μm to 10 μm), and crosslinked methyl methacrylate such as crosslinked particulate resin comprising methyl methacrylate and diethylene glycol dimethacrylate (particle diameter: 4 μm to 10 μm). These particulate organic materials can be prepared by any ordinary method such as emulsion polymerization method, soap free emulsion polymerization method, seed emulsion polymerization method, dispersion polymerization method and suspension polymerization method.

The particulate inorganic material can be prepared from a solution. For example, a lower alkoxide of metal is added to a solvent such as ethanol. A particulate inorganic material containing the metal is then obtained in the presence of water, an acid or an alkali. The particulate inorganic material solution thus obtained is then added to a solution of a solvent-soluble thermoplastic polymer to prepare a dispersion of particulate inorganic material. Alternatively, a lower alkoxide of metal is added to a solution of thermoplastic polymer. Water, an acid or an alkali can then be added to the mixture to obtain a particulate inorganic matter containing the metal.

In the case where a lower alkoxide of metal is added to a thermoplastic polymer precursor solution to prepare a particulate inorganic material, when the thermoplastic polymer precursor becomes a thermoplastic polymer when acted upon by heat, a composite of polymer with an inorganic material can be obtained. As the lower alkoxide of metal there may be used tetraethoxy silane, tetraethoxy titane or the like.

(2) Acid Generator

In the present invention, it is not particularly necessary that an acid generator be used. In practice, however, it is preferred that an acid generator be used when it is desired to further enhance the sensitivity, i.e., sensitivity of polarity conversion. An acid generator is a compound which generates an acid when acted upon by heat or light. In general, there are known compounds which generate an acid when acted upon by light to be used as photo-cationic polymerization initiator, photo-radical polymerization initiator, optical decolorizer for dye, optical discolorizer or microresist and mixtures thereof. These acid generators may be used properly selected for use.

Examples of acid generators employable herein include onium salts such as diazonium salts described in S. I. Schlesnger, "Photogr. Sci. Eng.", 18, 387 (1974), and T. S. Bal et al., "Polymer", 21, 423 (1980), ammonium salts described in U.S. Pat. Nos. 4,069,055 and 4,069,056, and JP-A-3-140,140, phosphonium salts described in D. C. Necker et al., "Macromolecules", 17, 2468 (1984), C. S.

Wen et al., "Teh, Proc. Conf. Rad. Curing", ASIA, page 478, Tokyo, October 1988, U.S. Pat. Nos. 4,069,055 and 4,069,056, iodonium salts described in J. V. Crivello et al., "Macromolecules", 10(6), 1307 (1977), Chem. & Eng. News, Nov. 28, page 31 (1988), EP 104,143, U.S. Pat. Nos. 339,049 and 410,201, JP-A-2-150,848 and JP-A-2-296,514, sulfonium salts described in J. V. Crivello et al., "Polymer J.", 17, 73 (1985), J. V. Crivello et al., "J. Org. Chem.", 43, 3055 (1978), W. R. Watt et al., "J. Polymer Sci.", Polymer Chem. Ed., 22, 1789 (1984), J. V. Crivello et al., "Polymer Bull.", 14, 279 (1985), J. V. Crivello et al., "Macromolecules", 14 (5) 1141 (1981), J. V. Crivello et al., "J. Polymer Sci.", Polymer Chem. Ed., 17, 2877 (1979), EP 370,693, U.S. Pat. No. 3,902,114, EP 233,567, EP 297,443, EP 297,442, U.S. Pat. Nos. 4,933,377, 410,201, 339,049, 4,760,013, 4,734,444, 2,833,827, German Patents 2,904, 626, 3,604,580, 3,604,581, selenonium salts described in J. V. Crivello et al., "Macromolecules", 10 (6), 1307 (1977), J. V. Crivello et al., "J. Polymer Sci.", Polymer Chem. Ed., 17, 1047 (1979), and arsonium salt described in C. S. Wen et al., "Teh. Proc. Conf. Rad. Curing", ASIA, page 478, Tokyo, October 1988, organic halogen compounds described in U.S. Pat. No. 3,905,815, JP-B-46-4605, JP-A-48-36281, JP-A-55-32070, JP-A-60-239736, JP-A-61-169835, JP-A-61-169837, JP-A-62-58241, JP-A-62-212401, JP-A-63-70243, and JP-A-63-298339, organic metal/organic halogen compounds described in K. Meier et al., "J. Rad. Curing", 14 (4), 26 (1986), T. P. Gill et al., "Inorg. Chem.", 19, 3007 (1980), D. Astruc, "Acc. Chem. Res.", 19 (12), 377 (1986), and JP-A-2-161445, photo-acid generators having o-nitrobenzyl type protective group described in S. Hayase et al., "J. Polymer Sci.", 15, 753 (1987), E. Reichman et al., "J. Polymer Sci.", Polymer Chem. Ed., 23, 1 (1985), Q. Q. Zhu et al., "J. Photochem.", 36, 85, 39, 317 (1987), B. Amit et al., "Tetrahedron Lett.", (24) 2205 (1973), D. H. R. Barton et al., "J. Chem. Soc.", 3571 (1965), P. M. Collins et al., "J. Chem. Soc.", Perkin I, 1695 (1975), M. Rudinstein et al., "Tetrahedron Lett.", (17), 1445 (1975), J. W. Walker et al., "J. Am. Chem. Soc.", 110, 7170 (1988), S. C. Busman et al., "J. Imaging Technol.", 11 (4), (1985), H. M. Houlihan et al., "Macromolecules", 21, 2001 (1988), P. M. Collins et al., "J. Chem. Soc.", Chem. Commun., 532 (1972), S. Hayase et al., "Macromolecules", 18, 1799 (1985), E. Reichman et al., "J. Electrochem. Soc.", Solid State Sci. Technol., 130 (6), F. M. Houlihanetal., "Macromolecules", 21, 2001 (1988), EP0290,750, 046,083, 156,535, 271,851, 0,388,343, U.S. Pat. Nos. 3,901,710 and 4,181,531, JP-A-60-198538, and JP-A-53-133022, compounds which undergo photodecomposition to generate sulfonic acid such as iminosulfonate described in TUNOOKA et al., "Polymer Preprints", Japan, 35 (8), G. Berner et al., "J. Rad. Curing", 13 (4), W. J. Mijs et al., "Coating Technolo.", 55 (697), 45 (1983), Akzo, H. Adachi et al., "Polymer Preprints", Japan, 37 (3), EP 0199, 672, 84515, 199,672, 044,115, and 0101,122, U.S. Pat. Nos. 4,618,554, 4,371,605, and 4,431,774, JP-A-64-18143, JP-A-2-245756, and JP-A-3-140109, and disulfone compounds described in JP-A-61-166544.

Further, a polymer compound having an acid generator incorporated its main chain or side chain may be used. Examples of such a polymer compound include compounds described in M. E. Woodhouse et al., "J. Am. Chem. Soc.", 104, 5586 (1982), S. P. Pappas etal., "J. Imaging Sci.", 30 (5), 218 (1986), S. Kondo et al., "Makromol. Chem. Rapid. Commun.", 9, 625 (1988), Y. Yamada et al., "Makromel. Chem.", 152, 153, 163 (1972), J. V. Crivello et al., "J. Polymer Sci.", Polymer Chem. Ed., 17, 3845 (1979), U.S. Pat. No. 3,849,137, German Patent 3914407, JP-A-63-26653, JP-A-55-164824, JP-A-62-69263, JP-A-63-14603, JP-A-63-163452, JP-A-62-153853, and JP-A-63-146029.

Moreover, a compound which generates an acid when acted upon by light described in V. N. R. Pillai, "Synthesis", (1), 1 (1980), A. Abad et al., "Tetrahedron Lett.", (47) 4555 (1971), D. H. R. Barton et al., "J. Chem. Soc.", (C), 329 (1970), U.S. Pat. No. 3,779,778, and EP 126,712 may be used.

In the present invention, the content of such an acid generator, if any, is normally about 40% by weight or less, preferably 20% by weight or less, more preferably 5% by weight or less based on the total solid content in the sensitive layer. When the content of such an acid generator exceeds 40% by weight, it can easily cause scumming on printed matters to disadvantage.

(3) Dyes, Sensitizing Dyes, Etc.

If necessary, the sensitive layer in the photosensitive lithographic printing plate of the invention may comprise various compounds incorporated therein besides the foregoing additives to obtain various properties required for lithographic printing plate.

For example, when the acid generator to be used has no sensitivity in the visible range, various acid generator sensitizing dyes may be used to activate the acid generator with respect to light in the visible range. Examples of such a useful sensitizing dye include pyran dyes described in U.S. Pat. No. 5,238,782, cyanine dyes and squarylium dyes described in U.S. Pat. No. 4,997,745, melocyanine dyes described in U.S. Pat. No. 5,262,276, pyrylium dyes described in JP-B-8-20732, Michler's ketone, thioxanthone, ketocoumarin dyes, and 9-phenylacridine. Besides these sensitizing dyes, bisbenzylidene ketone dyes described in U.S. Pat. No. 4,987,230 and polycyclic aromatic compounds such as 9,10-diphenylanthracene may be used.

Examples of other components to be used include a dye having a great absorption in the visible range which can be used as an image colorant.

Specific examples of such a dye include Oil Yellow #101, Oil Yellow #103, Oil Pink #312, Oil Green BG, Oil Blue BOS, Oil Blue #603, Oil Black BY, Oil Black BS, Oil Black T-505 (produced by Orient Chemical Industries Limited), Victorian Pure Blue, Crystal Violet (CI42555), Methyl Violet (CI42535), Ethyl Violet, Rhodamine B (CI145170B), Malachite Green (CI42000), Methylene Blue (CI52015), and dyes described in JP-A-62-293247.

These dyes are preferably added because the lithographic printing precursor having an image thus formed thereon has an image area and a non-image area which can be easily distinguished from each other. The amount of such a dye to be added is from 0.01 to 10% by weight based on the total solid content in the sensitive layer.

(4) Other Additive Components

The photosensitive lithographic printing plate precursor of the invention may comprise a nonionic surface active agent as described in JP-A-62-251740 and JP-A-3-208514 or an amphoteric surface active agent as described in JP-A-59-121044 and JP-A-4-13149 incorporated therein to enhance the stability in processing against developing conditions.

Specific examples of the nonionic surface active agent employable herein include sorbitan tristearate, sorbitan monopalmitate, sorbitan trioleate, monoglyceride stearate, and polyoxyethylene nonylphenyl ether.

Specific examples of the amphoteric surface active agent employable herein include alkyl di(aminoethyl)glycine, alkyl polyaminoethylglycine hydrochloride, 2-alkyl-N-carboxyethyl-N-hydroxyethylimidazoliniumbetain, and N-tetradecyl-N,N-betain type surface active agents (e.g., Amogen K, produced by Dai-ich Kogyo Seiyaku Co., Ltd.). The proportion of the sum of the foregoing nonionic surface active agent and amophoteric surface active agent in the sensitive layer in the radiation-sensitive lithographic printing plate precursor is preferably from 0.05 to 15% by weight, more preferably from 0.1 to 5% by weight.

The sensitive layer in the radiation-sensitive lithographic printing plate precursor of the invention may further comprise a plasticizer incorporated therein as necessary to provide the coating film with flexibility. Examples of such a plasticizer employable herein include oligomers and polymers of butyl phthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofuryl oleate, acrylic acid, and methacrylic acid.

Besides these plasticizers, the previously mentioned onium salts, haloalkyl-substituted s-triazine, epoxy compound, vinyl ethers, phenol compound having hydroxymethyl group, phenol compound having alkoxymethyl group, phenol novolak resin, and cresol novolak resin may be added.

The radiation-sensitive lithographic printing plate precursor of the invention can be normally prepared by dissolving the foregoing various components in a solvent, and then applying the solution to a proper support as a sensitive layer. Examples of the solvent employable herein include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxy ethane, methyl lactate, ethyl lactate, N,N-dimethyl acetamide, N,N-dimethyl formamide, tetramethylurea, N-methylpyrrolidone, dimethyl sulfoxide, sulfolan, γ-butyrolactone, toluene, and water. However, the present invention should not be construed as being limited to these solvents. These solvents may be used singly or in admixture. The concentration of the foregoing components (total solid content, including additives) in the solvent is preferably from 1 to 50% by weight. The coated amount (solid content) on the support obtained after coating and drying depends on the purpose but normally is preferably from 0.5 to 50% by weight for lithographic printing plate. The application of the coating solution can be accomplished by various methods. Examples of these methods include bar coating method, rotary coating method, spray coating method, curtain coating method, dip coating method, air knife coating method, blade coating method, and roll coating method. As the coated amount decreases, the apparent sensitivity rises, but the film properties of the image recording layer are deteriorated.

The sensitive layer in the radiation-sensitive lithographic printing plate precursor of the invention may comprise a surface active agent for improving the coatability thereof, such as fluorine-based surface active agent as described in JP-A-62-170950, incorporated therein. The preferred amount of such a surface active agent to be added is from 0.01 to 1% by weight, more preferably from 0.05 to 0.5% by weight based on the total solid content in the sensitive layer.

Support

As the support to be used in the invention there may be used a dimensionally stable tabular material. Examples of such a tabular material employable herein include paper, paper laminated with a plastic (e.g., polyethylene, polypropylene, polystyrene), metal plate (e.g., aluminum, zinc, copper), plastic film (e.g., cellulose diacetate, cellulose triacetate, cellulose propionate, cellulose butyrate, cellulose acetobutyrate, cellulose nitrate, polyethylene terephthalate, polyethylene, polystyrene, polypropylene, polycarbonate, polyvinyl acetal), and paper or plastic film having the foregoing metal laminated or vacuum-deposited thereon.

As the support of the invention there is preferably used a polyester film or aluminum plate. An aluminum plate, which has dimensional stability and is relatively inexpensive, is especially preferred. Suitable aluminum plates include a pure aluminum plate and a plate of aluminum-based alloys containing small amounts of different elements. Aluminum-laminated or deposited plastic films are also preferred. The different elements providing aluminum alloys include silicon, iron, manganese, copper, magnesium, chromium, zinc, bismuth, nickel, and titanium. The content of these different elements in the alloy is 10% by weight at the most. The most ideal aluminum support for use in the present invention is a pure aluminum plate. Since 100% pure aluminum is difficult to produce with the state-of-the-art refining techniques, nearly pure aluminum with a trace of different elements will do. Thus, the aluminum plate to be used in the present invention is not particularly limited by composition, and aluminum plates made of conventional known materials can be utilized appropriately. The thickness of the support which can be used in the present invention is usually about 0.1 to 0.6 mm, preferably 0.15 to 0.4 mm, still more preferably 0.2 to 0.8 mm.

If desired, the aluminum plate is subjected to degreasing with a surface active agent, an organic solvent, an aqueous alkali solution, etc. prior to surface graining.

Surface graining of the aluminum plate can be carried out by various methods, for example, mechanical graining, electrochemical surface dissolution, or selective chemical surface dissolution. Mechanical graining is conducted in a known manner, for example, by ball polishing, brush polishing, blasting or buffing. Electrochemical graining can be carried out in a hydrochloric acid or nitric acid electrolytic solution with an alternating or direct current applied. A combination of mechanical graining and electrochemical graining can be used as taught in JP-A-54-63902.

If desired, the grained aluminum plate is subjected to etching with an alkali and neutralization. The plate can then be anodized to acquire increased water-receptivity and wear resistance. The electrolyte to be used in anodizing can be anything capable of forming a porous oxide layer, usually sulfuric acid, hydrochloric acid, oxalic acid, chromic acid or a mixture thereof. The electrolyte concentration depends on the kind.

Variable according to the kind of the electrolyte, anodizing conditions are not unequivocally specified. Anodizing is usually carried out at an electrolyte concentration of 1 to 80% by weight, a liquid temperature of 5° C. to 70° C., a current density of 5 to 60 A/dm$^2$, a voltage of 1 V to 100 V, and for an electrolysis time of 10 seconds to 5 minutes.

The anodized layer is preferably formed to an amount (depth) of 1.0 g/m$^2$ or more. If the amount of the anodized layer falls below 1.0 g/m$^2$, the resulting lithographic printing plate tends to have an insufficient press life or easily receives scratches on its non-image area, to which ink adheres (so-called "scumming on scratches").

The aluminum plate which has thus been anozided is then subjected to hydrophilic treatment on the surface thereof as necessary. As the hydrophilic treatment method to be used in the invention there may be used an alkali metal silicate method (e.g., aqueous solution of sodium silicate) as disclosed in U.S. Pat. Nos. 2,714,066, 3,181,461, 3,280,734 and 3,902,734. In accordance with this method, the support is dipped or electrolyzed in an aqueous solution of sodium silicate. Besides this method, a method comprising treatment with potassium fluorozirconate as disclosed in JP-B-36-22063 or a polyvinylphosphonic acid as disclosed in U.S. Pat. Nos. 3,276,868, 4,158,461 and 4,689,272 may be used.

The radiation-sensitive lithographic printing plate precursor of the invention may comprise a subbing layer provided on the support as necessary.

As the subbing layer component there may be used any organic compound. Such an organic compound can be selected from the group consisting of carboxymethyl cellulose, dextrin, gum arabic, organic phosphonic acids such as phosphonic acids having amino group (e.g., 2-aminoethylphosphonic acid) and phenylphosphonic acid, naphthylphosphonic acid, alkylphosphonic acid, glycerophosphonic acid, methylenediphosphonic acid and ethylenediphosphonic acid which may having substituents, organic phosphoric acids such as phenylphosphoric acid, naphthylphosphoric acid, alkylphosphoric acid and glycerophosphoric acid which may have substituents, organic phosphinic acids such as phenylphosphinic acid, naphthylphosphinic acid, alkylphosphinic acid and glycerophosphinic acid which may have substituents, amino acids such as glycine and β-alanine, and amine hydrochlorides having hydroxyl group such as trithanolamine. Two or more of these organic compounds may be used in admixture.

The coated amount of the organic subbing layer is preferably from 2 to 200 mg/m$^2$.

In the manner as mentioned above, the lithographic printing plate precursor of the invention can be prepared. The lithographic printing plate precursor thus prepared is then imagewise exposed to light from a light source such as solid laser and semiconductor laser which emit infrared rays having a wavelength of from 760 nm to 1,200 nm. The lithographic printing plate precursor of the invention which has been irradiated with laser beam is immediately mounted on an offset printing machine to effect printing of a large number of sheets.

Plate Making Method

The method for making a printing plate from the lithographic printing plate precursor will be described hereinafter. For the imagewise exposure of the lithographic printing plate precursor, any light source which emits active light can be used. The light source which can be preferably used emits light having a wavelength ranging from red light to infrared light. In particular, semiconductor laser and YAG laser, which emit light in this range, are desirable. Further, excimer laser (XeF), He—Cd laser, N$_2$ laser, LD-excited Nd, external resonator type Fourth-HG utilizing second harmony obtained by YAG laser internal resonance type SHG in BBO crystal, and Q switch LD-excited solid laser may be used. Examples of active light sources other than laser include xenon discharge lamp, mercury vapor lamp, tungsten lamp, tungsten halogen lamp, xenon arc lamp, fluorescent lamp, and other ultraviolet light sources.

The recording of image may be carried out by any of surface exposure method and scanning method. The surface exposure on the surface exposure light source, if any, is preferably from 0.1 to 10 J/cm$^2$, more preferably from 0.1 to 1 J/cm$^2$ before modification by printing image, though depending on the illuminance. If the support is transparent, the lithographic printing plate precursor may be exposed to light through the back surface of the support. The exposure time can be widely selected so far as required exposure can be provided. In general, the exposure illuminance is preferably predetermined such that the foregoing exposure can be obtained when irradiation takes place for 0.01 msec to 10 minutes, preferably for 0.01 msec to 1 minute.

If necessary, the procedure of making the lithographic printing plate may include a step of "gumming" involving the application of a burning conditioner containing a plate surface protective agent (so-called gumming solution) for the purpose of protecting the non-image area. Gumming is effected for various purposes, e.g., preventing the hydrophilic surface of the lithographic printing plate from being affected by trace amount of contaminants from the air and showing a hydrophilicity drop, enhancing the hydrophilicity of the non-image area, preventing the lithographic printing plate from being deteriorated during the period between after plate making and before printing or the period between the suspension of printing and the resumption of printing, preventing finger grease, ink, etc. from being attached to the non-image area during the handling of the lithographic printing plate such as mounting on the printing machine and hence preventing the non-image area from being ink-receptive and stainable, preventing the non-image area and image-area from being scratched during the handling of the lithographic printing plate.

Specific examples of film-forming water-soluble resin for this purpose include gum arabic, cellulose derivatives (e.g., carboxymethyl cellulose, carboxyethyl cellulose, methyl cellulose), modification products thereof, polyvinyl alcohol, derivatives thereof, polyvinyl pyrrolidone, polyacrylamide, copolymers thereof, acrylic acid copolymers, vinyl methyl ether/maleic anhydride copolymer, vinyl acetate/maleic anhydride copolymer, styrene/maleic anhydride copolymer, roasted dextrin, enzymatically decomposed dextrin, and enzymatically decomposed etherified dextrin.

The content of the foregoing water-soluble resin in the protective agent in the burning conditioner is preferably from 3 to 25% by weight, more preferably from 10 to 25% by weight.

In the present invention, two or more of the foregoing water-soluble resins may be used in admixture.

The agent for protecting the surface of the lithographic printing plate may further comprise various surface active agents incorporated therein. Examples of surface active agents employable herein include anionic surface active agents and nonionic surface active agents. Examples of the anionic surface active agent include aliphatic alcohol sulfuric acid ester salts, tartaric acid, malic acid, lactic acid, levulinic acid, and organic sulfonic acid. Mineral acids such as nitric acid, sulfuric acid and phosphoric acid are useful. At least one or more of mineral acids, organic acids and inorganic salts may be used in combination.

Besides the foregoing components, a lower polyhydric alcohol such as glycerin, ethylene glycol and triethylene glycol may be used as a wetting agent as necessary. The amount of such a wetting agent to be used is preferably from 0.1 to 5.0% by weight, more preferably from 0.5 to 3.0% by weight based on the weight of the protective agent. The surface protective agent for the lithographic printing plate of the invention may comprise a preservative or the like incorporated therein besides the foregoing components. For example, benzoic acid, derivative thereof, phenol, formalin, sodium dehydroacetate, etc. may be added in an amount of from 0.005 to 2.0% by weight.

The plate surface protective agent may comprise an anti-foaming agent incorporated therein. Preferred examples of anti-foaming agent include organic silicone compounds.

The amount of such an anti-foaming agent to be added is preferably from 0.0001 to 0.1% by weight.

The plate surface protective agent may comprisean organic solvent incorporated therein to prevent the deterioration of the ink-receptivity of the image area. A preferred organic solvent is difficultly water-soluble. As such an organic solvent there may be used a petroleum fraction having a boiling point of from about 120° C. to 250° C. Examples of such a petroleum fraction include a plasticizer having a freezing point of 15° C. or lower and a boiling point of 300° C. or higher such as dibutyl phthalate and dioctyl adipate. Such an organic solvent is added in an amount of from 0.05 to 5% by weight.

The surface protective agent may be used in any form of uniform solution type, suspension type and emulsion type, but the emulsion type containing the organic solvent as described above exhibits excellent performance. In this case, it is preferred to contain the protective agent with a surface active agent in combination as disclosed in JP-A-55-105581.

The printing plate precursor which has been imagewise exposed and optionally gummed may be mounted on a printing machine for printing. Alternatively, the printing plate precursor which has been exposed may be immediately mounted on the printing machine (without being passed through development step) for printing. Alternatively, the printing plate precursor may be mounted on the printing machine where it is then subjected to imagewise scanning exposure by laser beam to form a lithographic printing plate on the printing machine. In other words, the plate-making method using the lithographic printing plate precursor of the invention makes it possible to provide a lithographic printing plate free from development step.

EXAMPLES

The present invention will be further described in the following examples, but the present invention should not be construed as being limited thereto.

Examples 1 to 4
(Preparation of Particulate Photo-heat Conversion Agent)

A mixture having the following composition was prepared in a 500 ml beaker. The mixture was then stirred at room temperature for 6 hours to prepare a reaction solution containing an organic photo-heat conversion compound and a metal compound.

<Formulation of Reaction Solution of Particulate Photo-heat Conversion Compound 1>

| | |
|---|---|
| IR dye [Exemplary Compound (1)] | 0.5 g |
| 5 wt-% aqueous ammonia | 50 g |
| Ethanol | 50 g |
| Tetraethoxy silane | 5.4 g |

Subsequently, the reaction solution thus obtained was heated to a temperature of 40° C. where it was then stirred for 10 hours. The reaction solution was encapsulated in a 500 ml cellophane bag, and then subjected to dialysis with tap water overnight. The resulting dispersion of gel particles was then dried at room temperature by an evaporator to obtain 5.0 g of a particulate silica gel having a dye encapsulated therein (particulate photo-heat conversion agent 1). The particulate photo-heat conversion agent 1 was then measured for particle diameter by means of a particle diameter meter (Type LA-920 laser diffractometry/scattering particle diameter distribution meter, produced by HORIBA, Ltd.). The results were 0.5 $\mu$m.

The particulate photo-heat conversion agents 2 to 4 having the following constitutions were prepared in the same manner as mentioned above except that the IR dye having the foregoing formulation was replaced by the following photo-heat conversion dyes.

| Particulate photo-heat conversion agent | Photo-heat conversion dye | Average particle diameter ($\mu$m) |
|---|---|---|
| Particle 1 | Exemplary Compound (1) | 0.5 |
| Particle 2 | Exemplary Compound (2) | 1.0 |
| Particle 3 | Exemplary Compound (16) | 2.2 |
| Particle 4 | Exemplary Compound (19) | 0.8 |

(Preparation of Unprocessed Photosensitive Lithographic Printing Plate)

<Support>

An aluminum plate (material: 1050) having a thickness of 0.30 mm was degreased by cleaning with trichloroethylene, grained on the surface thereof with a nylon brush and an aqueous suspension of 400-mesh pumice stone, and then thoroughly washed with water. The aluminum plate thus processed was dipped in a 45° C. 25% aqueous solution of sodium hydroxide for 9 seconds so that it was etched, rinsed, dipped in a 2% nitric acid for 20 seconds, and then rinsed. The etched amount of the grained surface of the aluminum plate was about 3 g/m$^2$. Subsequently, the aluminum plate was subjected to electrolysis with a 7% sulfuric acid as an electrolytic solution at a current density of 15 A/dm$^2$ to form a dc anodized film having a density of 3 g/m$^2$, rinsed, and then dried.

<Coating of Sensitive Layer>

Subsequently, the following photosensitive solution was prepared, applied to the foregoing processed aluminum support, and then dried at a temperature of 100° C. for 2 minutes to obtain radiation-sensitive lithographic printing plate precursors A to D. The coated amount of the sensitive layer thus dried will be given in the table below.

<Composition of Photosensitive Solution>

| | |
|---|---|
| Heat-decomposable polymer (Exemplary Compound 1p-4; molecular weight: 20,000) | 1.00 g |
| Particulate photo-heat conversion agent (Particles 1 to 4) | 0.5 g |
| MEGAFAC F-177 (fluorine-based surface active agent produced by DAINIPPON INK & CHEMICALS, INC.) | 0.06 g |
| Methyl ethyl ketone | 20 g |
| Methyl alcohol | 7 g |

<Composition of Sensitive Layer>

| Printing plate precursor | Particulate photo-heat conversion agent | Added amount of particle | Coated amount (dried) |
|---|---|---|---|
| A | Particle 1 | 0.5 g | 1.5 g/m$^2$ |
| B | Particle 2 | 0.5 g | 1.3 g/m$^2$ |
| C | Particle 3 | 0.5 g | 1.6 g/m$^2$ |
| D | Particle 4 | 0.5 g | 1.8 g/m$^2$ |

The printing plate precursors A to D thus obtained were each exposed to laser beam (beam diameter: 23 $\mu$m) from an IR laser which emits infrared ray having a wavelength of 838 nm. The printing plate precursors thus exposed were then each mounted unprocessed on a lithlon printing machine for ordinary printing. During this procedure, the printed matter was observed to see if the image area was fairly formed and the non-image area was scummed. The results are set forth in Table 1 below. As a result, 10,000 sheets of printed matter having a good quality were obtained.

The printing plates thus obtained were each observed for laser-scanned area under microscope. The width of lines was then measured to evaluate the sensitivity. The results are set forth in Table 1 below. The closer to the beam diameter of 23 μm the width of lines is, the higher is the sensitivity (sensitivity of polarity conversion). In all the examples of the invention, the width of lines was close to the beam diameter, showing that the sensitivity is sufficiently high.

TABLE 1

| Example | Printing plate precursor | Blur on image area | Scum on non-image area | Sensitivity (μm) |
|---|---|---|---|---|
| 1 | A | None | None | 20 |
| 2 | B | None | None | 19 |
| 3 | C | None | None | 20 |
| 4 | D | None | None | 18 |

The radiation-sensitive lithographic printing plate precursor according to the invention comprises a sensitive layer having an organic photo-heat conversion compound encapsulated in and protected by a metal oxide. In this arrangement, photo-heat conversion can be effectively performed. As a result, the sensitivity of polarity conversion can be improved, making it possible to effect printing with excellent printing quality free from scumming on printed matters. The use of the lithographic printing plate precursor according to the invention makes it possible to effect direct plate making from digital data from computers using infrared laser. Thus, the radiation-sensitive lithographic printing plate precursor according to the invention has a high utility.

Examples 5 to 8
(Preparation of Particulate Photo-heat Conversion Agent)

A mixture having the following composition was prepared in a 500 ml beaker. The mixture was then stirred at room temperature for 6 hours to prepare a reaction solution containing an organic photo-heat conversion compound and a metal compound.

<Formulation of Reaction Solution of Particulate Photo-heat Conversion Compound 5>

| IR dye [Exemplary Compound (1)] | 0.5 g |
| 5 wt-% aqueous ammonia | 50 g |
| Ethanol | 50 g |
| Tetraethoxy silane | 5.4 g |

Subsequently, the reaction solution thus obtained was heated to a temperature of 40° C. where it was then stirred for 10 hours. The reaction solution was encapsulated in a 500 ml cellophane bag, and then subjected to dialysis with tap water overnight. The resulting dispersion of gel particles was then dried at room temperature by an evaporator to obtain 5.0 g of a particulate silica gel having a dye encapsulated therein (particulate photo-heat conversion agent 5). The particulate photo-heat conversion agent 5 was then measured for particle diameter by means of a particle diameter meter (Type LA-920 laser diffractometry/scattering particle diameter distribution meter, produced by HORIBA, Ltd.). The results were 0.4 μm.

The particulate photo-heat conversion agents 6 to 8 having the following constitutions were prepared in the same manner as mentioned above except that the IR dye having the foregoing formulation was replaced by the following photo-heat conversion dyes.

| Particulate photo-heat conversion agent | Photo-heat conversion dye | Average particle diameter (μm) |
|---|---|---|
| Particle 5 | Exemplary Compound (1) | 0.4 |
| Particle 6 | Exemplary Compound (2) | 1.0 |
| Particle 7 | Exemplary Compound (3) | 2.2 |
| Particle 8 | Exemplary Compound (4) | 0.8 |

These particulate photo-heat conversion agents were each then subjected to shaking with glass beads in the form of 10 wt-% methyl ethyl ketone dispersion by means of a paint shaker to undergo dispersion.

(Preparation of Unprocessed Photosensitive Lithographic Printing Plate)
<Coating of Sensitive Layer>

As a binder there was used 0.4 g of Exemplary Compound 1–11 for Compound A. As a hydrolysis-polymerizable compound there was used 0.4 g of tetraethoxy silane. To a solution comprising these additives, 0.6 g of dispersion of each of the various particulate photo-heat conversion agents and 1.1 g of methyl ethyl ketone was then added 40 mg of a 50% aqueous solution of phosphoric acid. The mixture was then stirred for 10 minutes. The dispersion of particulate photo-heat conversion agent used was a 10% MEK dispersion obtained by dispersing the particulate photo-heat conversion agent in methyl ethyl ketone (hereinafter abbreviated as "MEK") with glass beads by means of a paint shaker. The coating solutions thus prepared were each applied to a corona-charged PET substrate by means of a rod bar #20. The composition of the sensitive layer in the printing plate precursors A to D will be set forth in Table 2 below.

<Composition of Sensitive Layer>

TABLE 2

| Printing plate precursor | Particulate photo-heat conversion agent (10% methyl ethyl dispersion) | Added amount of particle | Coated amount (dried) |
|---|---|---|---|
| A | Particle 5 | 4 g | 3.5 g/m² |
| B | Particle 6 | 4 g | 3.4 g/m² |
| C | Particle 7 | 4 g | 3.0 g/m² |
| D | Particle 8 | 4 g | 2.8 g/m² |

The printing plate precursors A to D thus obtained were each exposed to laser beam (beam diameter: 30 μm) from an IR laser which emits infrared ray having a wavelength of 838 nm. The printing plate precursors thus exposed were then each mounted unprocessed on a lithlon printing machine for ordinary printing. During this procedure, the printed matter was observed to see if the image area was fairly formed and the non-image area was scummed. The results are set forth in Table 3 below. As a result, 10,000 sheets of printed matter having a good quality were obtained.

The printing plates thus obtained were each observed for laser-scanned area under microscope. The width of lines was then measured to evaluate the sensitivity. The results are set forth in Table 3 below. The closer to the beam diameter of 23 nm the width of lines is, the higher is the sensitivity (sensitivity of polarity conversion). In all the examples of the invention, the width of lines was close to the beam diameter, showing that the sensitivity is sufficiently high.

TABLE 3

| Example | Printing plate precursor | Blur on image area (after 10,000 sheets of printing) | Scum on non-image area (after 10,000 sheets of printing) | Sensitivity ($\mu$m) |
|---|---|---|---|---|
| 5 | A | None | None | 28 |
| 6 | B | None | None | 29 |
| 7 | C | None | None | 25 |
| 8 | D | None | None | 28 |

Examples 9 to 13
(Synthesis of Crosslinked Polymer)
<Synthesis of Polymer KP-3>

In a three-neck flask were charged 0.4 mol of styrenesulfonic acid-1-methyl-2-methoxyethyl ester, 0.1 mol of N-[(3-methacroyloxy)propyl]-2,3-dimethylmaleimide and 203 g of methyl ethyl ketone. To the mixture was then added 2.44 g of azobisdimethyl valeronitrile at a temperature of 65° C. in a stream of nitrogen. The mixture was then stirred at the same temperature for 5 hours. Methyl ethyl ketone was then distilled off under reduced pressure to obtain a solid matter. The solid matter thus obtained was identified as a polymer having an average molecular weight of 25,000 by GPC (polystyrene as a standard).

<Synthesis of Polymers KP-4, 5>

Polymers KP-4 and 5 were synthesized in the same manner as Polymer KP-3 except that N-[(3-methacroyloxy)propyl]-2,3-dimethylmaleimide was replaced by N-[(6-methacroyloxy)hexyl]-2,3-dimethylmaleimide and allylmethacrylic acid, respectively. For Polymer KP-4, cyclohexyl styrenesulfonate was used as styrenesulfonic acid ester. Polymer KP-4 had an average molecular weight of 56,000, and Polymer KP-5 had an average molecular weight of 19,000.

<Synthesis of Polymer KP-1>

Polymerization was effected in the same manner as Polymer KP-3 except that N-[(3-methacroyloxy)propyl]-2,3-dimethylmaleimide was replaced by 2-methacryloxyethyl isocyanate. To the reaction solution was added acrylic acid (0.1 mol). The reaction mixture was then heated with stirring for 8 hours. After the termination of reaction, methyl ethyl ketone was distilled off under reduced pressure to obtain a solid matter. The solid matter thus obtained was identified as a polymer having an average molecular weight of 23,000 by GPC (polystyrene as a standard).

(Preparation of Support)

An aluminum plate (material: 1050) having a thickness of 0.30 mm was degreased by cleaning with trichloroethylene, grained on the surface thereof with a nylon brush and an aqueous suspension of 400-mesh pumice stone, and then thoroughly washed with water. The aluminum plate thus processed was dipped in a 45° C. 25% aqueous solution of sodium hydroxide for 9 seconds so that it was etched, rinsed, dipped in a 2% nitric acid for 20 seconds, and then rinsed. The etched amount of the grained surface of the aluminum plate was about 3 g/m². Subsequently, the aluminum plate was subjected to electrolysis with a 7% sulfuric acid as an electrolytic solution at a current density of 15 A/dm² to form a dc anodized film having a density of 2.4 g/m², rinsed, and then dried.

(Preparation of Printing Plate Precursor)

As a coating solution for image-forming layer there was prepared a solution containing components set forth in Table 4 below. The solution thus prepared was applied to the support prepared as mentioned above, and then dried at a temperature of 80° C. for 1 minute.

Subsequently, the coating composition was exposed to ultraviolet rays (using metal halide; 1,000 counts) to obtain a lithographic printing plate precursor having a photo-crosslinked image-forming layer.

TABLE 4

| Printing plate precursor | Polymer used | Monomer added | Sensitizer (polymerization initiator) | Particulate photo-heat conversion compound (10% MEK solution) | Coating solvent |
|---|---|---|---|---|---|
| E | KP-3/ 0.4 g | None | Compound X/ 0.04 g | Particle 5/0.04 g | MEK/ 1.6 g |
| F | KP-5/ 0.4 g | ATMMT/ 0.2 g | DMAB/0.04 g | Particle 5/0.04 g | MEK/ 1.6 g |
| G | KP-1/ 0.4 g | ATMMT/ 0.2 g | DMAB/0.04 g | Particle 5/0.04 g | MEK/ 1.6 g |
| H | KP-4/ 0.4 g | None | Compound X/ 0.04 g | Particle 5/0.04 g | MEK/ 1.6 g |
| I | KP-3/ 0.4 g | None | Compound X/ 0.04 g | Particle 6/0.04 g | MEK/ 1.6 g |

(Note)
MEK: Methyl ethyl ketone
ATMMT: Pentaerythritol tetraacrylate
DMAB: 4,4'-Dimethylaminobenzophenone (Note) MEK: Methyl ethyl ketone
ATMMT: Pentaerythritol tetraacrylate
DMAB: 4,4'-Dimethylaminobenzophenone
Compound X:

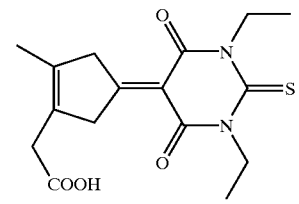

(Plate-making and Printing)

The printing plate precursors E to I thus obtained were each imagewise exposed to laserbeam (beam diameter: 23 $\mu$m) from a YAG laser which emits infrared ray having a wavelength of 1064 nm in the same manner as in Example 1. The lithographic printing plate precursors thus exposed were then each mounted unprocessed on a lithlon printing machine to undergo printing test over 20,000 sheets.

During this procedure, the printed matter was observed to see if the image area was fairly formed and the non-image area was scummed. As can be seen in the results shown in Table 5 below, none of 20,000 sheets of printed matters showed scumming on the printed surface and blurred image. Thus, a good printing quality was kept.

TABLE 5

| Example | Printing plate precursor | Blur on image area | Scum on non-image area |
|---|---|---|---|
| 9 | F | None | None |
| 10 | F | None | None |

TABLE 5-continued

| Example | Printing plate precursor | Blur on image area | Scum on non-image area |
|---|---|---|---|
| 11 | G | None | None |
| 12 | H | None | None |
| 13 | I | None | None |

The radiation-sensitive lithographic printing plate precursor according to the invention comprises a sensitive layer having in combination an organic photo-heat conversion compound encapsulated in and protected by a metal oxide and a crosslinked polymer compound as a binder. In this arrangement, photo-heat conversion can be effectively performed without decomposing the photo-heat conversion compound. As a result, the sensitivity of polarity conversion can be improved, making it possible to effect printing with excellent printing quality free from scumming on printed matters. The use of the lithographic printing plate precursor according to the invention makes it possible to effect direct plate making from digital data from computers using infrared laser. Thus, the radiation-sensitive lithographic printing plate precursor according to the invention has a high utility.

While the invention has been described in detail and with reference to specific embodiments thereof, it will be apparent to one skilled in the art that various changes and modifications can be made therein without departing from the spirit and scope thereof.

This application is based on Japanese patent applications No. Hei-11-225560, filed Aug. 9, 1999 and No. Hei-11-237263, filed Aug. 24, 1999, the entire contents of which are incorporated herein by reference.

What is claimed is:

1. A radiation-sensitive lithographic printing plate precursor comprising a photo-heat conversion agent incorporated therein, wherein said photo-heat conversion agent is a particulate metal oxide comprising an organic photo-heat conversion compound encapsulated therein wherein said organic photo-heat conversion compound is a dye which is soluble in water or a solvent having high water-solubility.

2. The radiation-sensitive lithographic printing plate precursor according to claim 1, wherein the metal constituting the particulate metal oxide is selected from the group consisting of alkaline earth metal, transition metal, rare earth metal and metal belonging to the groups 3 to 5 and 13 to 15 in the periodic table.

3. The radiation-sensitive lithographic printing plate precursor according to claim 2, wherein the particulate metal oxide is obtained by the polymerization reaction of a hydrolysis-polymerizable organic compound of the metal.

4. The radiation-sensitive lithographic printing plate precursor according to claim 1, wherein the organic photo-heat conversion compound is a dye or pigment which absorbs infrared rays having a wavelength range of from 760 nm to 1,200 nm.

5. The radiation-sensitive lithographic printing plate precursor according to claim 4, wherein the dye or pigment is contained in the composition of metal oxide-encapsulated photo-heat conversion compound in an amount of from 0.01 to 50% by weight based on the solid content of the composition.

6. The radiation-sensitive lithographic printing plate precursor according to claim 4, wherein the dye or pigment is contained in the composition of metal oxide-encapsulated. photo-heat conversion compound in an amount of from 0.1 to 10% by weight based on the solid content of the composition.

7. The radiation-sensitive lithographic printing plate precursor according to claim 1, wherein the particulate metal oxide has a particle size of from 0.001 μm to 20 μm.

8. A particulate radiation-sensitive metal oxide comprising an organic photo-heat conversion compound encapsulated therein wherein said organic photo-heat conversion compound is a dye which is soluble in water or a solvent having high water-solubility.

9. A radiation-sensitive lithographic printing plate precursor having a sensitive layer comprising at least a binder and a photo-heat conversion agent incorporated therein provided on a support, wherein said binder is a crosslinked polymer compound having a functional group which changes from hydrophobic to hydrophilic when acted upon by an acid, radiation or heat and said photo-heat conversion agent is a particulate metal oxide comprising an organic photo-heat conversion compound encapsulated therein wherein said organic photo-heat conversion compound is a dye which is soluble in water or a solvent having high water-solubility.

10. The radiation-sensitive lithographic printing plate precursor according to claim 9, wherein the metal constituting the particulate metal oxide is selected from the group consisting of alkaline earth metal, transition metal, rare earth metal and metal belonging to the groups 3 to 5 and 13 to 15 in the periodic table.

11. The radiation-sensitive lithographic printing plate precursor according to claim 10, wherein the particulate metal oxide is obtained by the polymerization reaction of hydrolysis-polymerizable organic compound of the metal.

12. The radiation-sensitive lithographic printing plate precursor according to claim 9, wherein the organic photo-heat conversion compound is a dye or pigment which absorbs infrared rays having a wavelength range of from 760 nm to 1,200 nm.

13. The radiation-sensitive lithographic printing plate precursor according to claim 12, wherein the dye or pigment is contained in the composition of metal oxide-encapsulated photo-heat conversion compound in an amount of from 0.01 to 50% by weight based on the solid content of the composition.

14. The radiation-sensitive lithographic printing plate precursor according to claim 12, wherein the dye or pigment is contained in the composition of metal oxide-encapsulated photo-heat conversion compound in an amount of from 0.1 to 10% by weight based on the solid content of the composition.

15. The radiation-sensitive lithographic printing plate precursor according to claim 9, wherein the particulate metal oxide has a particle size of from 0.001 μm to 20 μm.

16. The radiation-sensitive lithographic printing plate precursor according to claim 9, wherein the polymer compound has a secondary sulfonic acid ester group or alkoxycarboxylic acid ester group as a functional group.

17. The radiation-sensitive lithographic printing plate precursor according to claim 9, wherein the polymer compound as the binder is a compound obtained by the reaction of a compound having in the same molecule a functional group which changes from hydrophobic to hydrophilic when acted upon by an acid, radiation or heat and a functional group which reacts with a hydrolysis-polymerizable compound wherein the hydrolysis-polymerizable compound is represented by the following general formula (1):

$$(R_1)_n-X-(OR_2)_{4-n} \qquad (1)$$

wherein $R_1$ and $R_2$ may be the same or different and each represent an alkyl or aryl group; X represents Si, Al, Ti or Zr; and n represents an integer of from 0 to 2.

* * * * *